United States Patent
Hamamoto

(10) Patent No.: US 12,518,058 B2
(45) Date of Patent: Jan. 6, 2026

(54) METHOD OF MANAGING DEVICE, RECORDING MEDIUM, AND SYSTEM

(71) Applicant: SHARP KABUSHIKI KAISHA, Osaka (JP)

(72) Inventor: Masanori Hamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 7 days.

(21) Appl. No.: 18/589,648

(22) Filed: Feb. 28, 2024

(65) Prior Publication Data

US 2024/0320372 A1    Sep. 26, 2024

(30) Foreign Application Priority Data

Mar. 20, 2023   (JP) ................ 2023-044556

(51) Int. Cl.
*G06F 21/62*   (2013.01)
*G06F 21/60*   (2013.01)

(52) U.S. Cl.
CPC ........ *G06F 21/6254* (2013.01); *G06F 21/602* (2013.01); *G06F 21/604* (2013.01)

(58) Field of Classification Search
CPC ... G06F 21/6254; G06F 21/602; G06F 21/604
See application file for complete search history.

(56) References Cited

U.S. PATENT DOCUMENTS

| | | | |
|---|---|---|---|
| 2011/0063672 A1* | 3/2011 | Sugimoto | G06F 21/6254 358/1.15 |
| 2019/0095644 A1* | 3/2019 | Park | G06F 21/6254 |
| 2020/0304685 A1* | 9/2020 | Inoue | H04L 9/0816 |
| 2020/0314150 A1* | 10/2020 | Hayashi | H04L 67/146 |
| 2020/0401724 A1* | 12/2020 | Song | G10L 15/26 |
| 2022/0374550 A1 | 11/2022 | Yagi | |
| 2023/0094317 A1* | 3/2023 | Kartoun | G07B 17/00508 726/26 |

FOREIGN PATENT DOCUMENTS

| | | | |
|---|---|---|---|
| JP | 2004-005418 A | | 1/2004 |
| JP | 2008059019 A | * | 3/2008 |
| WO | 2021/085519 A1 | | 5/2021 |

* cited by examiner

*Primary Examiner* — Kambiz Zand
*Assistant Examiner* — Lawrence Q Truong
(74) *Attorney, Agent, or Firm* — ScienBiziP, P.C.

(57) ABSTRACT

Device information about a device to be a management target is acquired out of devices in a network; confidential information is replace with identification information to conceal the confidential information, the confidential information being content to be a confidentiality target included in content included in the device information; the device information including content of the concealed confidential information is stored; and a first report or a second report is selected and output, the first report being a report in which the content of the confidentiality target is concealed with the identification information, the second report being a report in which the content to be the confidentiality target is not concealed.

12 Claims, 24 Drawing Sheets

FIG. 3A

```
E100a — USER=hamamoto
E101  — JOB=Print
E102  — SETTINGS=Color, A4
E104  — SHEETS=20
E105  — DATETIME=20221201104210
        ─────────────────────────
E100b — USER=tanaka
        JOB=Print
        SETTINGS=B/W, A4
        SHEETS=24
        DATETIME=20221201101230
        ─────────────────────────
E100c — USER=tanaka
        JOB=FACSIMILE
E103  — DESTINATION=06-aaaa-bbbb
        SHEETS=1
        Datetime=20221201095753
```

FIG. 3B

```
E110a — USER=fadafnjghsgdkfks
        JOB=Print
        SETTINGS=Color, A4
        SHEETS=20
        DATETIME=20221201104210
        ─────────────────────────
E110b — USER=hhkdjfiwlwelajkd
        JOB=Print
        SETTINGS=B/W, A4
        SHEETS=24
        DATETIME=20221201101230
        ─────────────────────────
E110c — USER=hhkdjfiwlwelajkd
        JOB=FACSIMILE
E113  — DESTINATION=xhmyjujtmbfjseyr
        SHEETS=1
        Datetime=20221201095753
```

| ACCOUNT NAME | PASSWORD |
|---|---|
| admin123 | abc123 |
| service | def456 |
| ⋮ | ⋮ |

FIG. 7

| SETTING ITEM NAME | SETTING CONTENT |
|---|---|
| STORE JOB LOG INCLUDING CONCEALED INFORMATION | Yes |
| ⋮ | ⋮ |

FIG. 8

| IDENTIFICATION INFORMATION | CONCEALED INFORMATION |
|---|---|
| fadafnjghsgdkfks | HAMAMOTO |
| hhkdjfiwlwelajkd | TANAKA |
| ⋮ | ⋮ |

FIG. 24

| ACCOUNT NAME | PASSWORD | AUTHORIZATION |
|---|---|---|
| admin123 | abc123 | ADMINISTRATOR |
| service | def456 | SERVICE PERSON |
| ⋮ | ⋮ | ⋮ |

FIG. 26

| IDENTIFICATION INFORMATION | CONCEALED INFORMATION | CONFIDENTIAL INFORMATION TYPE |
|---|---|---|
| fadafnjghsgdkfks | HAMAMOTO | NAME |
| hhkdjfiwlwelajkd | TANAKA | NAME |
| xhmyjujtmbfjseyr | 06-aaaa-bbbb | FAX NUMBER |
| dgfesbjghkugvbnk | 03-cccc-dddd | FAX NUMBER |
| fhrpimxkgtxfcemq | user1@example.com | E-MAIL ADDRESS |
| bwctydjedqxvzpei | user2@example.com | E-MAIL ADDRESS |
| ⋮ | ⋮ | ⋮ |

FIG. 27

| CONFIDENTIAL INFORMATION TYPE | AUTHORIZATION | |
| | ADMINISTRATOR | SERVICE PERSON |
|---|---|---|
| NAME | INCLUDED | INCLUDED |
| FAX NUMBER | NOT INCLUDED | INCLUDED |
| E-MAIL ADDRESS | NOT INCLUDED | INCLUDED |
| ⋮ | ⋮ | ⋮ |

METHOD OF MANAGING DEVICE, RECORDING MEDIUM, AND SYSTEM

BACKGROUND OF THE INVENTION

Field of the Invention

The disclosure relates to a method of managing a device and the like. The present application claims priority from Japanese Patent Application No. 2023-44556 filed on Mar. 20, 2023, the content to which is hereby incorporated by reference into this application.

Description of the Background Art

Conventionally, techniques for remotely managing and monitoring devices such as image forming devices are known. For example, a technique for remotely managing an image forming device in a firewall from the outside of the firewall has been proposed. Moreover, a technique has been proposed in which, in order to prevent individuals from being identified, personal data is converted into first and second pseudonymous names, the personal data is further re-assigned to be anonymized so that the personal data cannot be restored at the time of providing the personal data, and the anonymized personal data is provided to a third party together with actual personal data.

An object of the disclosure is to provide, for example, a technique for appropriately outputting a report based on device information including confidential information on content to be a confidentiality target.

SUMMARY OF THE INVENTION

A method of managing a device, according to the disclosure includes: acquiring device information about a device to be a management target out of devices in a network; replacing confidential information with identification information to conceal the confidential information, the confidential information being content to be a confidentiality target included in content included in the device information; storing the device information including content of the concealed confidential information; and selecting and outputting a first report or a second report, the first report being a report in which the content of the confidentiality target is concealed with the identification information, the second report being a report in which the content to be the confidentiality target is not concealed.

A program according to the disclosure provides: a function of acquiring device information from a device to be a management target out of the devices; a function of replacing confidential information with identification information to conceal the confidential information, the confidential information being content to be a confidentiality target included in content of the device information; a function of transmitting the device information including content of the concealed confidential information; and a function of outputting, based on a request, a report in which the content to be the confidentiality target is not concealed.

A system according to the disclosure includes an acquirer that acquires device information about a device to be a management target from a device in a network; a replacer that replaces confidential information with identification information to conceal the confidential information, the confidential information being content to be a confidentiality target included in content of the device information; a storage that stores the device information including content of the concealed confidential information; and an outputter that outputs, based on a request, a first report or a second report, the first report being a report in which the content to be the confidentiality target is concealed with the identification information, the second report being a report in which the content to be the confidentiality target is decrypted into the confidential information.

According to the disclosure, it is possible to provide, for example, a technique for appropriately outputting a report based on device information including confidential information on content to be a confidentiality target.

BRIEF DESCRIPTION OF THE DRAWINGS

FIGS. 3A and 3B are diagrams illustrating examples of a job log and concealed job log.

FIG. 7 is a diagram illustrating a data configuration example of a setting table according to the first embodiment.

FIG. 8 is a diagram illustrating an example of a data configuration of correspondence information according to the first embodiment.

FIG. 24 is a diagram illustrating an example of a data configuration of account information according to a third embodiment.

FIG. 26 is a diagram illustrating an example of a data configuration of correspondence information according to the third embodiment.

FIG. 27 is a diagram illustrating an example of a data configuration of authority information according to the third embodiment.

DESCRIPTION OF THE PREFERRED EMBODIMENTS

Embodiments for implementing the disclosure will be described hereinafter with reference to the accompanying drawings. The following embodiments are examples for explaining the disclosure, and the technical scope of the disclosure explained in the claims is not limited to the following description.

When a device such as an image forming device installed in a closed network such as a company network is remotely managed and monitored, it is desirable that a report based on device information (a job log or the like) of the device is easily outputted. This is because the state of the device can be grasped by an administrator or the like of the device through reference of the report.

An example of a method of easily outputting a report is a method of generating and outputting a report by a cloud application on the Internet. Accordingly, the administrator or the like of the device can use the cloud application to easily grasp the state of the managed device. Here, by including information such as personal information, e.g., the user who has executed the job and the communication destination, in the report, it is possible to grasp the state of the device in more detail. On the other hand, the device information including personal information should be prevented from being transmitted to the outside of the company network. As described above, there is a problem in that there is a need for a system that generates and outputs a report including personal information and the like by using a cloud application or the like without transmitting device information including personal information and the like from a closed network such as a company network to an external network such as the Internet.

However, the above-described problem is not considered in the conventional techniques. For example, in a technique by which a management device in a firewall periodically receives a command from a mediation device outside the firewall, outputting a report is not taken into consideration. In a technique for preventing an individual from being identified, outputting a report including personal information or the like is not taken into consideration.

Therefore, the following embodiment describes an example of an optimal method for appropriately outputting a report including confidential information that is information to be concealed from an external network, such as personal information, and a report including the confidential information.

1. First Embodiment 1.1. Overall Configuration

Figure 1:
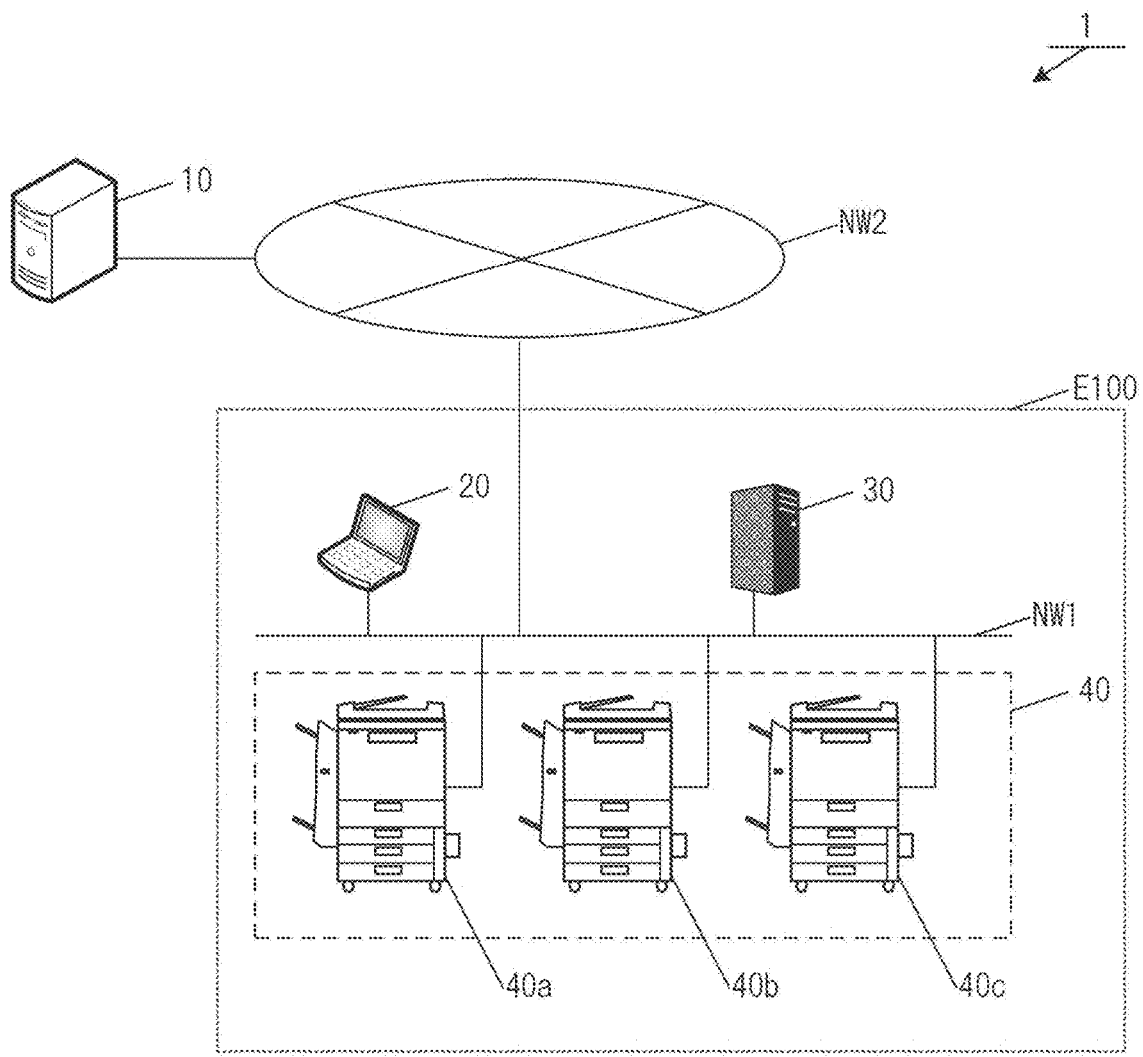
FIG. 1 is a diagram illustrating an overall configuration of a system according to a first embodiment.

FIG. 1 is a diagram illustrating an overall configuration of a system 1 to which a management system of the disclosure is applied. The system 1 includes a network NW1 (first network) and a network NW2 (second network). The network NW1 is, for example, an internal network constructed by a local area network (LAN) or the like, and is a company network (intranet). The network NW2 is, for example, an external network (wide area network (WAN)), such as the Internet. The networks NW1 and NW2 are connected to each other via a gateway device but are separate networks. The gateway device is, for example, a network device such as a firewall or a router.

Connected to the network NW1 are a terminal device 20, a processing device 30 that runs an agent, and image forming devices 40. In the example of FIG. 1, as the image forming devices 40, three image forming devices 40, or an image forming device 40a, an image forming device 40b, and an image forming device 40c, are connected to the network NW1. A server device 10 is connected to the network NW2.

The server device 10 is, for example, an information processing device installed on a cloud. The server device 10 may be composed of a single device or be composed of multiple devices. For example, the data stored in the server device 10 may be stored in a storage area of another device on the cloud, and the process executed by the server device 10 may be executed by multiple devices in a distributed manner. Alternatively, the server device 10 may be constructed on a virtual personal computer (PC).

The server device 10 manages one or more information processing devices. For example, software (device management software) for implementing remote monitoring and management (RMM) is installed in the server device 10. For example, the device management software provides a user with a service (hereinafter referred to as a management service) for outputting information on an information processing device that is a management target (hereinafter referred to as a target device) or providing a means for changing a setting of the target device.

The server device 10 may provide a user interface (UI) of the management service via a web browser. That is, the server device 10 may provide the management service as a cloud application.

The terminal device 20 is a device used by a user, and is composed of, for example, a mobile terminal such as a smartphone or a tablet, or an information processing device such as a PC. The terminal device 20 may be connected to the network NW1, as illustrated in FIG. 1, but alternatively may be connected to the network NW2. Alternatively, multiple terminal devices 20 may be included in the system 1.

The processing device 30 is an information processing device in which software called an agent is installed, and the agent is executed. The processing device 30 implements the function of the agent by executing the agent. The processing device 30 is constructed of, for example, a PC or a server in which RMM agent software is installed. The functions implemented by the agent will be described later.

The image forming device 40 is also referred as a multi-function printer/peripheral (MFP), and is an information processing device having a copy function, a scan function, a print function, a fax function, and the like. As illustrated in FIG. 1, a plurality of image forming devices 40 may be connected to the network NW1. In the following description, when it is not necessary to distinguish between the respective image forming devices 40 connected to the network NW1, the image forming devices 40 are simply referred to as the image forming device 40. In the present embodiment, the image forming device 40 is described as a target device.

1.2. Functional Configuration 1.2.1. Server Device

Figure 2:
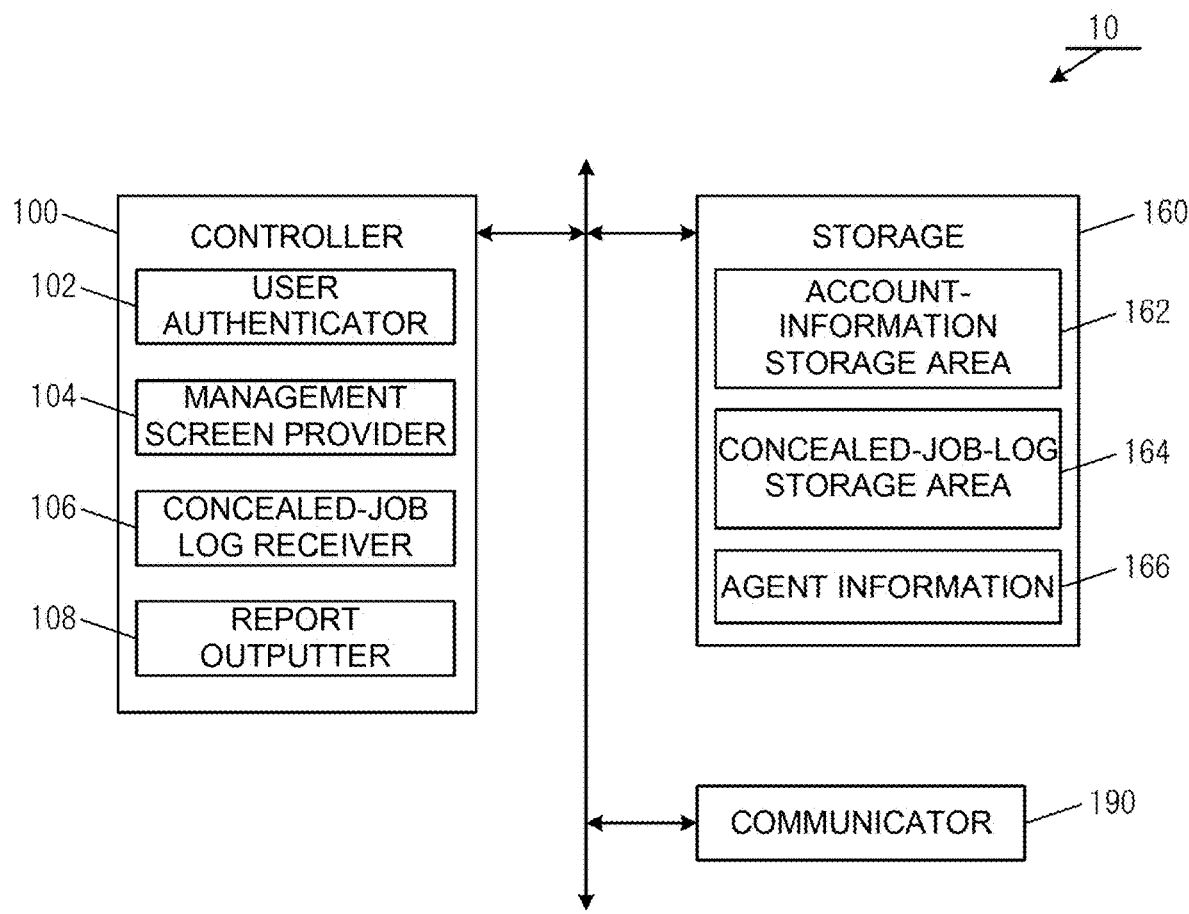
FIG. 2 is a diagram illustrating a functional configuration of a server device according to the first embodiment.

As illustrated in FIG. 2, the server device 10 includes a controller 100, a storage 160, and a communicator 190.

The controller 100 comprehensively controls the server device 10. The controller 100 implements various functions by reading and executing various programs stored in the storage 160. The controller 100 includes, for example, one or more computing devices (e.g., central processing units (CPUs)). The controller 100 may be configured as a system on a chip (SoC) having multiple functions among the functions described below.

The controller 100 executes the programs stored in the storage 160 to function as a user authenticator 102, a management screen provider 104, a concealed-job-log receiver 106, and a report outputter 108.

The user authenticator 102 authenticates a user who uses the management service. For example, the user authenticator 102 authenticates a user by matching authentication information input via an authentication screen to be described later with authentication information stored in advance in the server device 10 in association with inputted authentication information. The authentication information is information used for user authentication, and is, for example, an account name and a password. The authentication information may be information of an IC card or a smartphone possessed by the user who uses the management service, or may be biological information such as a face, a fingerprint, or a voiceprint of the user. That is, the user authenticator 102 may authenticate the user by using a known authentication method such as knowledge authentication, property authentication, or biometric authentication.

The management screen provider 104 provides information for displaying a management screen to a device (for example, the terminal device 20) used by a user who uses the management service and acquires information inputted via the management screen. The management screen is a screen viewed by a user who uses the management service. The management screen includes, for example, a setting screen for displaying the state of an agent operating in the company network and managing and changing the setting of the agent, and a screen for requesting a report.

The concealed-job-log receiver 106 receives a concealed job log. Here, a job log is one piece of device information of a target device (for example, the image forming device 40) and is device information having a log regarding a job executed in the target device as content. The concealed job log is a job log that is concealed by replacing the confidential information included in the job log with information different from the confidential information.

The device information is information of a target device and is information including the state of the target device, a setting value of the target device, and the like as content. The device information may be a job log, information indicating the state or setting content of the target device, information unique to the target device (a model name, a series name, a manufacturing number, or the like), or information obtained by combining these pieces of information. In the present embodiment, the device information is a job log.

FIG. 3A is a diagram illustrating an example job log. For example, as illustrated in FIG. 3A, the job log includes one or more items in each of which an item name and an item value are associated with each other. The job log includes, for example, the user name (E100a, E100b, E100c) of the user who executed the job, the type (E101) of the executed job, the setting content (E102) of the executed job, the communication destination (E103), such as a facsimile number, the number (E104) of sheets printed or transmitted, and the execution date and time (E105) of the job. The job log may include information such as an execution result of the job and a state of the device at the time of job execution.

The content included in the job log include content that is a confidentiality target. The content to be concealed is content to be a confidentiality target when the content is referred to from the outside of a network (for example, an intranet) to which a device that is a management target by the management service is connected. The content to be a confidentiality target is, for example, personal information, information for specifying a communication destination, unique information of the device, or the like. The content to be a confidentiality target may be set in advance or may be set by a contract or a user of the management service. The confidential information is specified or extracted on the basis of, for example, an item name of a specific item to be a confidentiality target, or a pattern of a character string of an item value.

In the present embodiment, specific content to be a confidentiality target is referred to as confidential information. For example, in a case where the content to be a confidentiality target is a user name and a communication destination, a specific user name or a specific communication destination (for example, a telephone number or the like) is confidential information. In this case, in the job log illustrated in FIG. 3A, the item value of the item of the user who executed the job (information after "USER=") and the item value of the item of the communication destination (information after "DESTINATION=") are confidential information. That is, the item values of the user (E100a, E100b, E100c) who executed the job and the communication destination (E103), which are the specific items included in the job log illustrated in FIG. 3A, are confidential information.

The confidential information included in the job log is concealed by being replaced with information different from the confidential information. The job log in which the confidential information is concealed is a concealed job log. FIG. 3B is a diagram illustrating an example concealed job log. In the concealed job log illustrated in FIG. 3B, the user name of the user who executed the job is replaced with information different from the user name (E110a, E110b, E110c). Similarly, in the concealed job log illustrated in FIG. 3B, the information of the communication destination is replaced with information different from the information of the communication destination (E113).

In the present embodiment, it is assumed that the confidential information is replaced with information corresponding to each piece of confidential information. That is, same pieces of confidential information are replaced with a same piece of information. In the present embodiment, information corresponding to confidential information is referred to as identification information.

The identification information may be, for example, a unique ID in a network to which the device to be a management target by the management service is connected.

For example, the user name "tanaka" (E100*b*, E100*c*) included in the job log illustrated in FIG. 3A is replaced with "hhkdjfiwlwelajkd" in the concealed job log illustrated in FIG. 3B (E110*b*, E110*c*). In this way, in the concealed job log, the confidential information itself is concealed, but same pieces of confidential information are replaced with a same identification information, so that the confidential information can be identified.

The report outputter 108 accepts a request for a report from a user and executes a process related to output of a report. A report is a material indicating a state (a use state, a communication state, or the like) of a target device (the image forming device 40 in the present embodiment). In the present embodiment, a report is assumed to be generated on the basis of a job log (job log report). In the present embodiment, it is assumed that the system 1 can output, to a user, two types of reports, that is, a concealed report (first report) in which confidential information is concealed with identification information and a report in which confidential information is not concealed (report including confidential information, second report).

In a case where a concealed report is requested from a user, the report outputter 108 generates a concealed report based on the concealed job log. For example, the report outputter 108 generates a concealed report by aggregating information included in the concealed job log or extracting information to be included in the report. When a user requests a report including confidential information, the report outputter 108 requests the agent to issue a report including confidential information. The process executed by the report outputter 108 will be explained later.

The storage 160 stores various programs and various types of data necessary for the operation of the server device 10. The storage 160 may include, for example, a storage device (auxiliary storage device) such as a read only memory (ROM), a random access memory (RAM), a solid state drive (SSD), which is a semiconductor memory, or a hard disk drive (HDD).

The storage 160 reserves, as storage areas, an account-information storage area 162 and a concealed-job-log storage area 164 for storing concealed job logs, and further stores agent information 166.

Figures 4, 5:
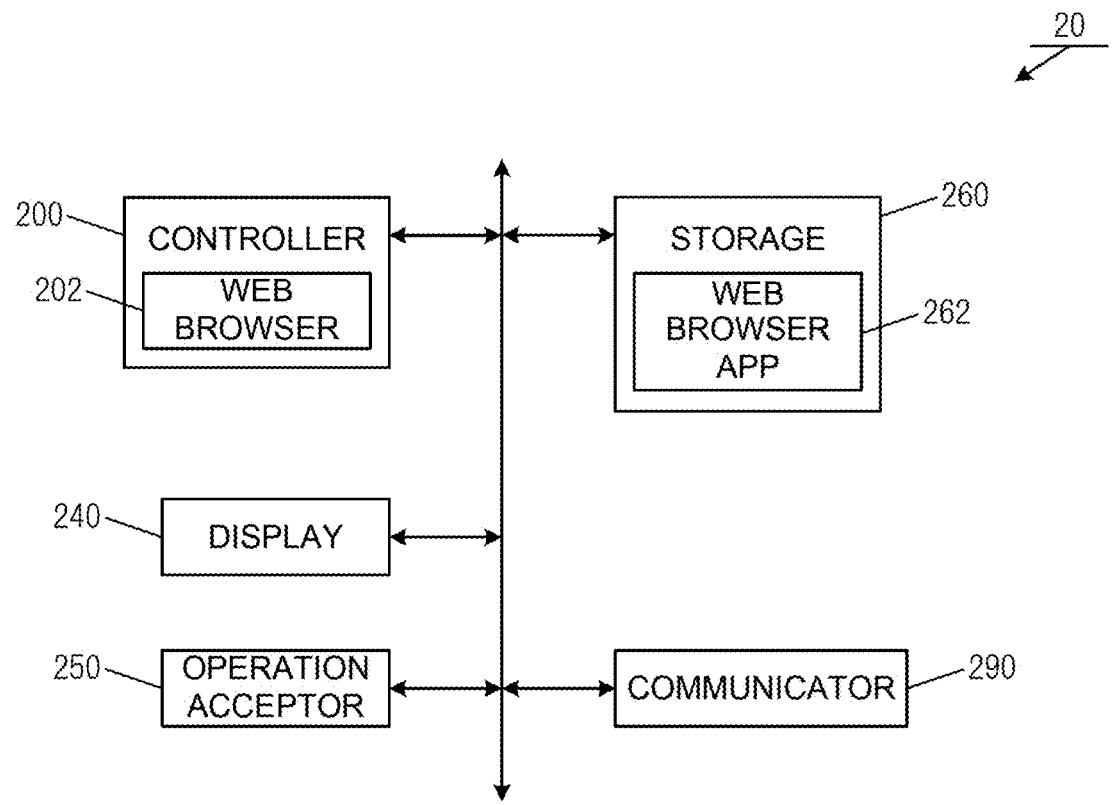
FIG. 4 is a diagram illustrating an example of a data configuration of account information according to the first embodiment.
FIG. 5 is a diagram illustrating a functional configuration of a terminal device according to the first embodiment.

The account-information storage area 162 stores information (account information) of an account of a user of the management service provided by the server device 10. For example, as illustrated in FIG. 4, the account information includes an account name (for example, "admin123") for specifying a user of the management service and a password (for example, "abc123") used for authentication of the user. The account information may include information other than the above-described information.

The agent information 166 is information used for communication with the agent. The agent information 166 includes, for example, an Internet Protocol (IP) address of the processing device 30 that is running the agent and a port number used for communication.

The communicator 190 communicates with an external device such as the terminal device 20 or the processing device 30 via a local area network (LAN) or a wide area network (WAN). The communicator 190 may include, for example, a communication device or a communication module such as a network interface card (NIC) used in a wired/wireless LAN.

1.2.2. Terminal Device

As illustrated in FIG. 5, the terminal device 20 includes a controller 200, a display 240, an operation acceptor 250, a storage 260, and a communicator 290.

The controller 200 comprehensively controls the terminal device 20. The controller 200 implements various functions by reading and executing various programs stored in the storage 260. The controller 200 may include, for example, one or more arithmetic devices (CPUs) or the like. The controller 200 may be configured as an SoC having multiple functions among the functions described below.

The controller 200 functions as a web browser 202 by executing a program stored in the storage 260. The web browser 202 displays a web page on the display 240.

The display 240 displays various types of information. The display 240 may include, for example, a display device such as a liquid crystal display (LCD), an organic electro-luminescence (EL) display, or a micro light emitting diode (LED) display.

The operation acceptor 250 accepts an operation instruction from a user who uses the terminal device 20. The operation acceptor 250 may include an input device such as a key switch (hard key) or a touch sensor. A method of detecting an input by contact (touch) on the touch sensor may be any common detection method such as a resistive film method, an infrared method, an electromagnetic induction method, and an electrostatic capacitive method. A touch panel in which the display 240 and the operation acceptor 250 are integrally formed may be mounted on the terminal device 20. The operation acceptor 250 may be configured as an interface connectable to an input device such as a keyboard or a mouse.

The storage 260 stores various programs and various types of data necessary for the operation of the terminal device 20. The storage 260 may include, for example, a storage device such as a RAM, an HDD, an SSD, and a ROM.

The storage 260 stores a web browser application 262. The web browser application 262 is an application for causing the controller 200 to function as the web browser 202.

The communicator 290 communicates with an external device such as the server device 10 via a LAN or a WAN. The communicator 290 may include, for example, a communication device or a communication module such as an NIC used in a wired/wireless LAN.

1.2.3. Processing Device

Figure 6:
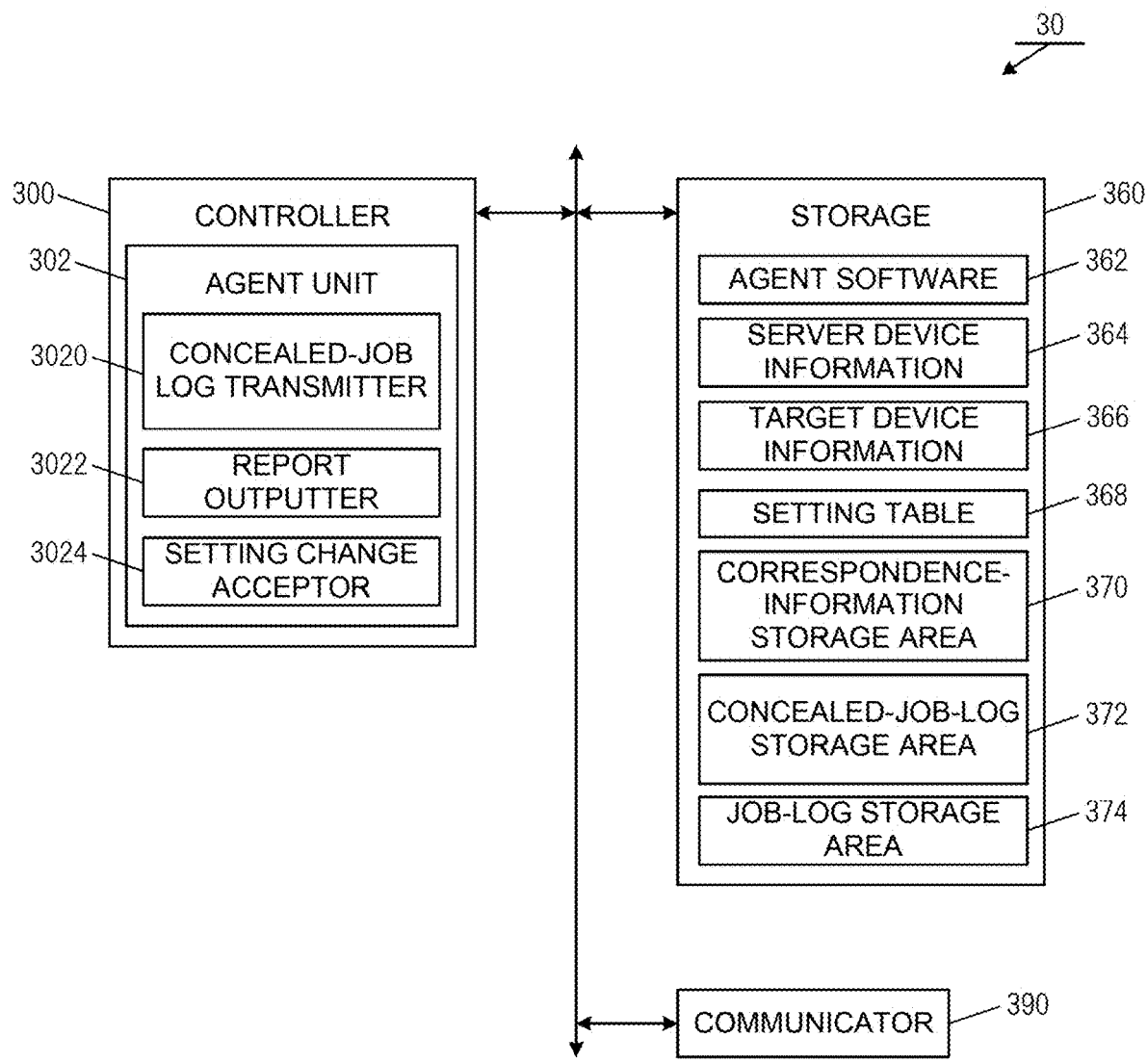
FIG. 6 is a diagram illustrating a functional configuration of a processing device according to the first embodiment.

As illustrated in FIG. 6, the processing device 30 includes a controller 300, a storage 360, and a communicator 390.

The controller 300 comprehensively controls the processing device 30. The controller 300 implements various functions by reading and executing various programs stored in the storage 360. The controller 300 may include, for example, one or more arithmetic devices (CPUs) or the like. The controller 300 may be configured as an SoC having multiple functions among the functions described below.

The controller 300 functions as an agent unit 302 by executing a program stored in the storage 360. In this way, the controller 300 causes the agent to be executed in the processing device 30.

The agent unit 302 provides the function of an agent. The agent unit 302 functions as a concealed-job-log transmitter 3020, a report outputter 3022, and a setting change receptor 3024.

The concealed-job-log transmitter 3020 generates a concealed job log on the basis of a job log acquired from the image forming device 40, which is a target device, and transmits the concealed job log to the server device 10. The process executed by the concealed-job-log transmitter 3020 will be explained later.

The report outputter 3022 outputs a report including confidential information. The process executed by the report outputter 3022 will be explained later.

The setting change receptor 3024 accepts a change in the setting of the agent. For example, in a case where the setting change receptor 3024 receives, from the server device 10, information of setting content indicating whether or not to store a job log including confidential information, the setting change receptor 3024 stores the setting content in a setting table 368.

The storage 360 stores various programs and various types of data necessary for the operation of the processing device 30. The storage 360 may include, for example, a storage device such as a RAM, an HDD, an SSD, and a ROM.

The storage 360 stores agent software 362, server device information 364, target device information 366, and a setting table 368, and further reserves, as storage areas, a correspondence-information storage area 370, a concealed-job-log storage area 372 for storing concealed job logs, and a job-log storage area 374 for storing job logs.

The agent software 362 is software that causes the controller 300 to function as the agent unit 302.

The server device information 364 is information used for communication with the server device 10 with which the agent performs communication. The server device information 364 includes, for example, an IP address of the server device 10 and a port number used for communication.

The target device information 366 is information used for communication with a target device (the image forming device 40 in the present embodiment) with which the agent performs communication. The target device information 366 includes, for example, an IP address of the image forming device 40 and a port number used for communication.

The setting table 368 is a table that stores content set in the processing device 30 for each setting item. As illustrated in FIG. 7, the setting table 368 is a table in which, for example, a setting item name (for example, "store a job log including confidential information") and a setting content (for example, "Yes") corresponding to the setting item name are stored in association with each other. In the present embodiment, the setting table 368 includes a setting item of "whether to store a job log including confidential information" as a setting item indicating whether or not to store a job log including confidential information in the processing device 30. As the setting content corresponding to the setting item, information of either "Yes" or "No" is stored, where "Yes" indicates that the job log including the confidential information is stored, and "No" indicates that the job log including the confidential information is not stored.

The correspondence-information storage area 370 stores information (correspondence information) indicating a correspondence relationship between confidential information and identification information. As illustrated in FIG. 8, the correspondence information includes identification information (for example, "fadafnjghsgdkfks") and confidential information (for example, "HAMAMOTO") corresponding to the identification information.

The communicator 390 communicates with an external device via a LAN or a WAN. The communicator 390 may include, for example, a communication device or a communication module such as an NIC used in a wired/wireless LAN.

1.2.4. Image Forming Device

Figures 9, 10:
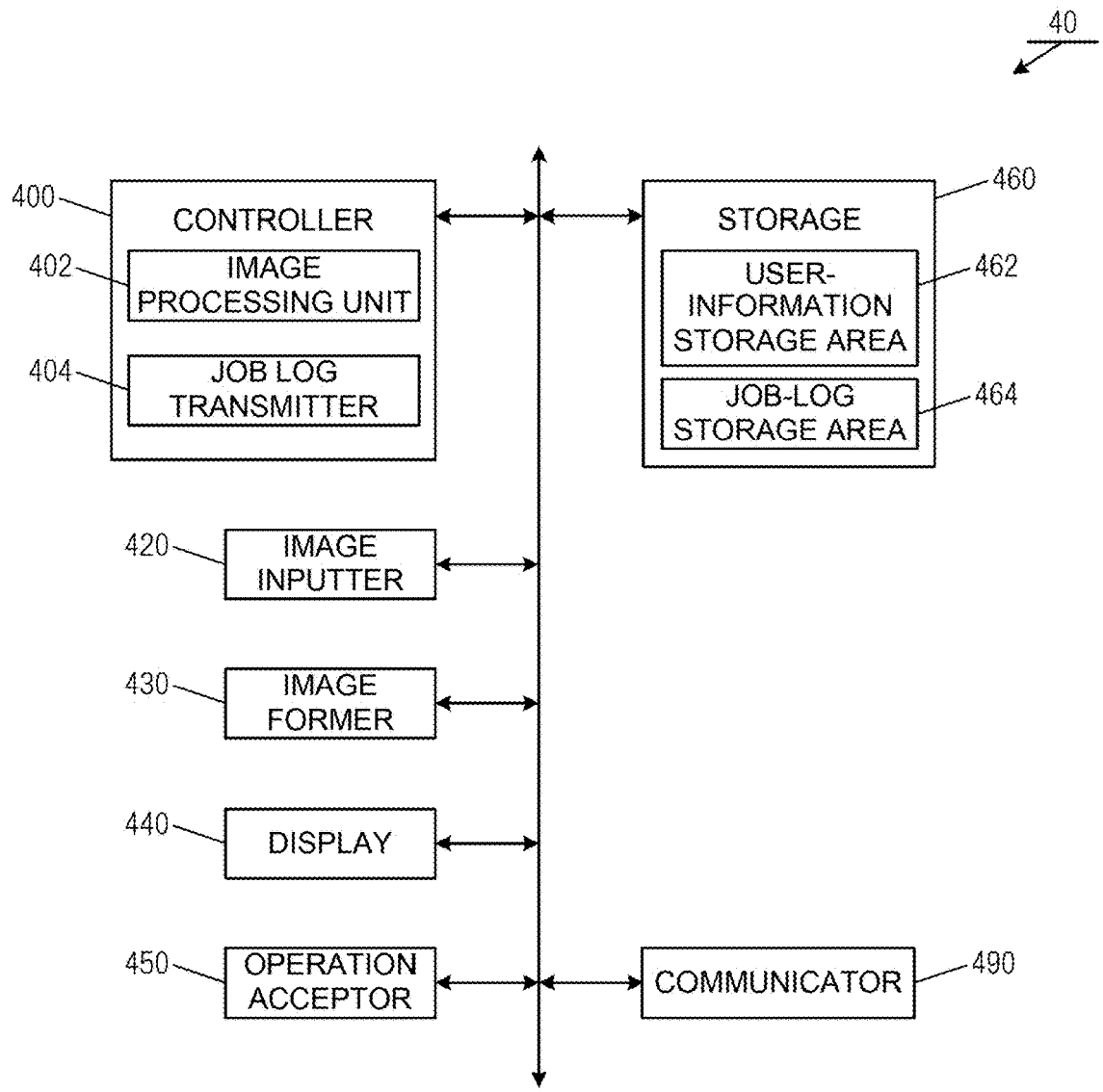
FIG. 9 is a diagram illustrating a functional configuration of an image forming device according to the first embodiment.
FIG. 10 is a diagram illustrating an example of a data configuration of user information according to the first embodiment.

As illustrated in FIG. 9, the image forming device 40 includes a controller 400, an image inputter 420, an image former 430, a display 440, an operation acceptor 450, a storage 460, and a communicator 490.

The controller 400 comprehensively controls the image forming device 40. The controller 400 implements various functions by reading and executing various programs stored in the storage 460. The controller 400 may include, for example, one or more arithmetic devices (CPUs) or the like. The controller 400 may be configured as an SoC having multiple functions among the functions described below.

The controller 400 functions as an image processing unit 402 and a job log transmitter 404 by executing programs stored in the storage 460.

The image processing unit 402 executes image processing. For example, the image processing unit 402 executes image processing such as sharpening processing and gradation conversion processing on a document or an image input via the image inputter 420 or the communicator 490. The job log transmitter 404 transmits a job log to the processing device 30 running the agent.

The image inputter 420 inputs an image to the image forming device 40. The image inputter 420 may include, for example, a scanner device that reads a document placed on a document table and an interface (terminal) for reading an image stored in a universal serial bus (USB) memory. The scanner device is a device that converts an image into an electrical signal by an image sensor such as a charge coupled device (CCD) or a contact image sensor (CIS), and quantizes and encodes the electrical signal.

The image former 430 forms (prints) an image on a recording medium such as a recording sheet. The image former 430 may include, for example, a printing device such as a laser printer using an electrophotographic method. For example, the image former 430 feeds a recording sheet from a sheet feeding tray provided in the image forming device 40, forms an image on a surface of the recording sheet, and outputs the recording sheet from a sheet output tray provided in the image forming device 40.

The display 440 displays various types of information. The display 440 may include a display device such as an LCD, an organic EL display, or a micro LED display.

The operation acceptor 450 accepts an operation instruction from a user who uses the image forming device 40. The operation acceptor 450 may include an input device such as a key switch (hard key) or a touch sensor. A method of detecting an input by a contact (touch) on the touch sensor may be a common detection method. A touch panel in which the display 440 and the operation acceptor 450 are integrally formed may be mounted on the image forming device 40.

The storage 460 stores various programs and various types of data necessary for the operation of the image forming device 40. The storage 460 may include, for example, a storage device such as a RAM, an HDD, an SSD, and a ROM.

The storage 460 reserves, as storage areas, a user-information storage area 462 and a job-log storage area 464 for storing a job log.

The user-information storage area 462 stores information of a user of the image forming device 40 (user information). For example, as illustrated in FIG. 10, the user information includes a user name (for example, "hamamoto") and a password (for example, "abc123"). The user information may include information other than the above-described information.

The communicator 490 communicates with an external device via a LAN or a WAN. The communicator 490 may include, for example, a communication device or a communication module such as an NIC used in a wired/wireless LAN.

1.3. Process Flow
1.3.1. Outline of Process

Figure 11:
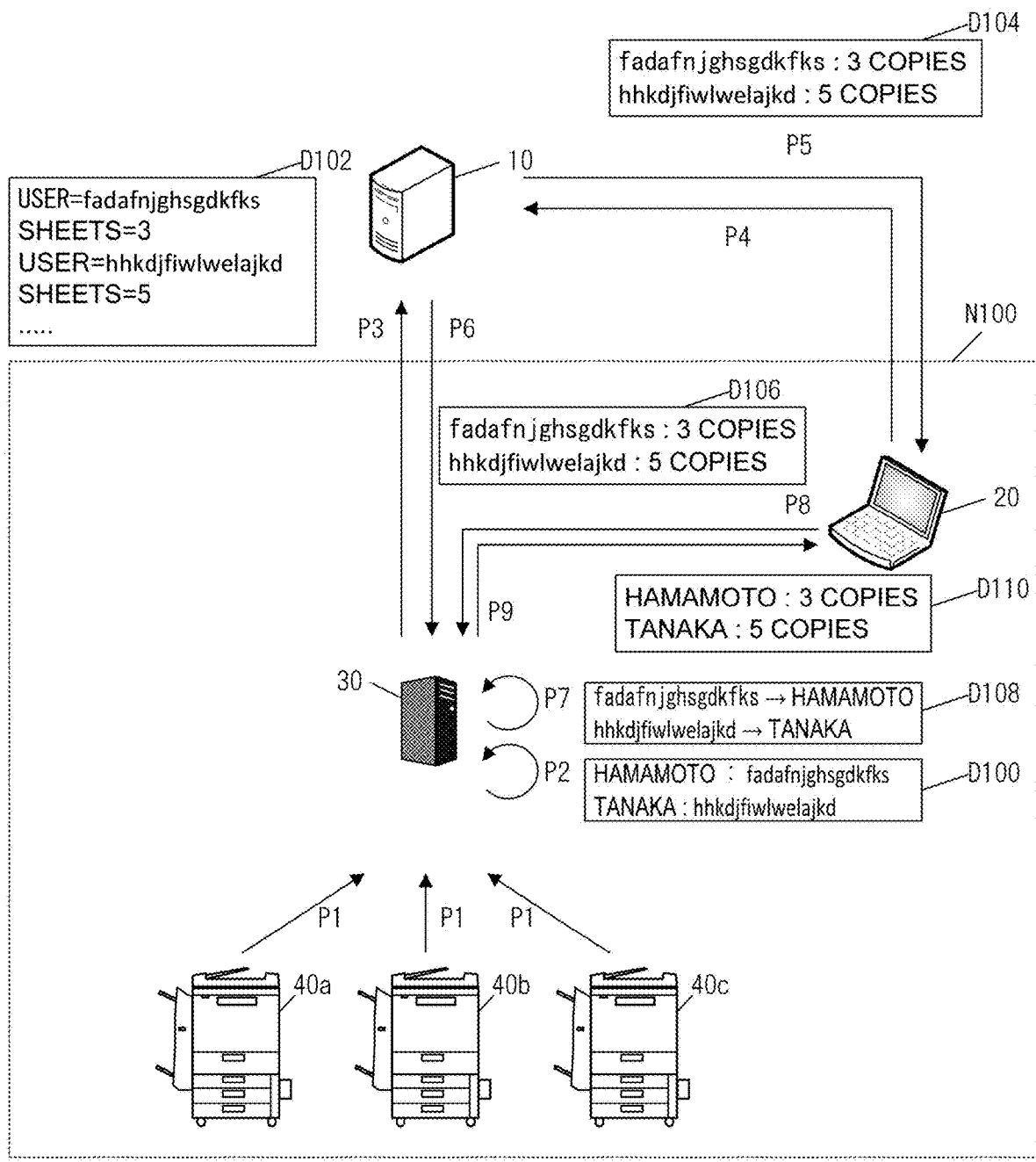
FIG. 11 is a diagram illustrating an outline of a process according to the first embodiment.

FIG. 11 is a diagram illustrating an overview of a process executed by each device included in the system 1. The reference sign N100 in FIG. 11 denotes a range of the network NW1 (for example, in an intranet). In the example of FIG. 11, the terminal device 20, the processing device 30, and the image forming device 40 are connected to the network NW1. In FIG. 11, an arrow extending from one device to another device indicates a communication source and a communication destination in each process.

First, the agent run by the processing device 30 acquires a job log from the image forming device 40 (P1). Subsequently, the agent run by the processing device 30 conceals the job log by replacing the confidential information included in the job log with the identification information, and generates a concealed job log (P2). At this time, the agent run by the processing device 30 stores correspondence information (D100) in which the confidential information and the identification information are associated with each other. Furthermore, the agent run by the processing device 30 transmits the concealed job log (D102) to the server device 10 (P3). In this way, the processing device 30 can prevent the job log including the confidential information from being transmitted to the outside of the network NW1.

Subsequently, the terminal device 20 requests a concealed report (first report) or a report including confidential information (second report) on the basis of an operation by a user (P4). That is, the user requests the server device 10 to issue a report via the terminal device 20.

When a request for the concealed report (first request) is made from the terminal device 20, the server device 10 outputs the concealed report (D104) to the terminal device 20 (P5).

Meanwhile, when a request (second request) for a report including confidential information is made from the terminal device 20, the server device 10 requests the agent ran by the processing device 30 to issue a report including the confidential information (P6). At this time, the server device 10 transmits the concealed report (D106) to the processing device 30.

When the issuance of the report including the confidential information is requested, the agent ran by the processing device 30 replaces the identification information included in the concealed report acquired from the server device 10 with the confidential information by using the correspondence information (P7). In this way, as indicated by D108, the concealed confidential information is restored (decrypted).

Furthermore, the agent ran by the processing device 30 outputs a report including the confidential information, and determines a universal resource locator (URL) for acquiring the report including the confidential information. For example, the processing device 30 sets the URL as a specific file path in the processing device 30. The agent ran by the processing device 30 transmits the URL for acquiring the report including the confidential information to the server device 10 as information of a redirect destination. The server device 10 transmits the URL of the redirect destination to the terminal device 20.

As a result, the terminal device 20 receives the information of the redirect destination from the server device 10 as a response to the request in P4. Furthermore, the terminal device 20 redirects to the redirect destination. In this way, for example, the terminal device 20 is connected to the processing device 30 (P8). As a result, the terminal device 20 can acquire a report (D110) including confidential information from the processing device 30 (P9).

Figure 12:
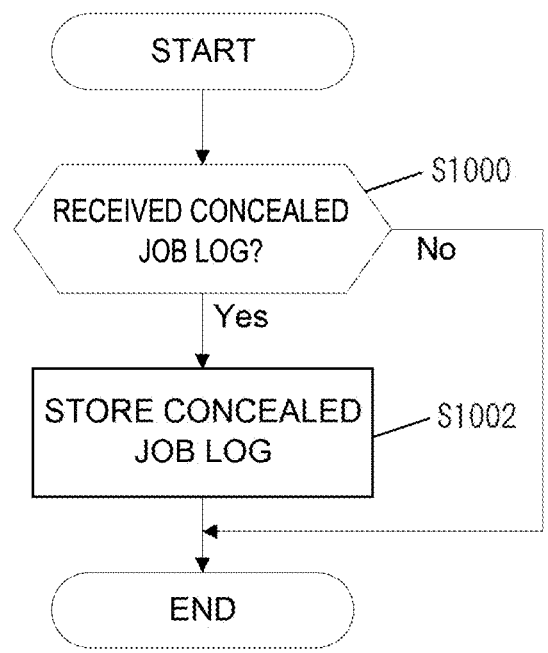
FIG. 12 is a flowchart of a job log reception process executed by the server device according to the first embodiment.

1.3.2. Process Executed by Server Device
1.3.2.1. Concealed Job Log Reception Process FIG. 12 is a flowchart illustrating a flow of a concealed job log reception process executed by the concealed-job-log receiver 106 of the server device 10.

First, the concealed-job-log receiver 106 determines whether or not a concealed job log has been received from the processing device 30 (step S1000).

When the concealed job log is received, the concealed-job-log receiver 106 stores the concealed job log in the concealed-job-log storage area 164 (Yes in step S1000 to step S1002). Meanwhile, when it is determined that the concealed job log has not been received, the concealed-job-log receiver 106 omits the process of step S1002 (No in step S1000).

The concealed job log may be unilaterally transmitted from the processing device 30 to the server device 10, or may be transmitted when the server device 10 requests the concealed job log from the processing device 30. When a report is requested from the terminal device 20, the server device 10 may request the concealed job log from the processing device 30. In this way, the server device 10 can acquire the concealed job log at the time when the report is requested.

1.3.2.2. Server-Side Report Output Process

Figure 13:
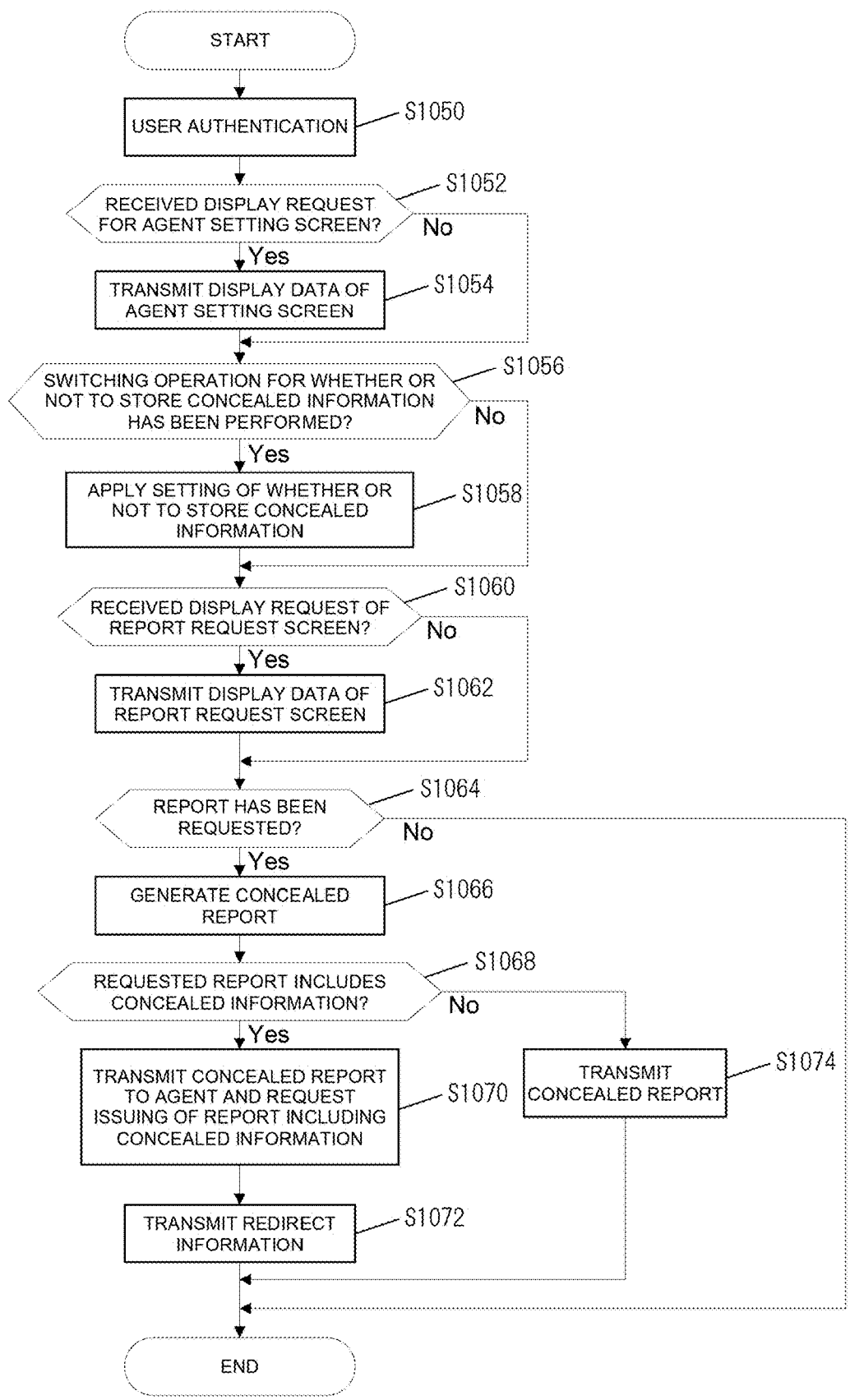
FIG. 13 is a flowchart of a server-side report output process executed by the server device according to the first embodiment.

FIG. 13 is a flowchart illustrating a flow of the server-side report output process executed by the server device 10. The process illustrated in FIG. 13 is executed by the server device 10 when the server device 10 provides the management service. In the following explanation, it is assumed that the server device 10 displays the UI of the management service via a web browser of a device (for example, the terminal device 20) used by a user who is using the management service.

First, the user authenticator 102 authenticates a user who uses the management service (step S1050). For example, the user authenticator 102 transmits display data of an authentication screen to a device (for example, the terminal device 20) used by the user who is using the management service. The display data is data used for displaying a predetermined screen, and is, for example, Hypertext Markup Language (HTML) data. When authentication information used for user authentication is received from a device used by a user who is using the management service, the user authenticator 102 performs user authentication based on the authentication information. When user authentication is successful, the user authenticator 102 manages the device that has transmitted the authentication information as a device to be used by the user who has been successfully authenticated.

The management screen provider 104 may transmit the display data to the device used by the user who is using the management service in accordance with the authentication result by the user authenticator 102. For example, when the user authentication is successful, the management screen provider 104 may transmit display data of a screen (menu screen) on which items to be set and information to be displayed can be selected, to the device used by the user who is using the management service. On the other hand, when the user authentication fails, the management screen provider 104 may transmit display data of a screen indicating that the management service is not available, to the device used by the user who is using the management service.

Subsequently, when the management screen provider 104 receives a request for displaying the agent setting screen from the device used by the user who has been authenticated, the management screen provider 104 transmits the display data of the agent setting screen to the device (Yes in step S1052 to step S1054). The agent setting screen is a screen for establishing settings related to the agent. The agent setting screen includes, for example, a check box for switching whether or not to store a job log including confidential information on the agent side (processing device 30). When a request for displaying the agent setting screen is not received, the management screen provider 104 omits the process of step S1054 (No in step S1052).

Subsequently, the management screen provider 104 determines whether or not an operation of switching the setting of whether or not to store a job log including confidential information on the agent side has been performed by the device used by the user who has been successfully authenticated (step S1056). For example, when the management screen provider 104 receives, from another device, information including setting content indicating whether or not to store a job log including confidential information on the agent side, it is determined that an operation of switching the setting of whether or not to store a job log including confidential information on the agent side has been performed. When an operation of switching the setting of whether or not to store a job log including confidential information is performed on the agent side, the management screen provider 104 applies the setting of whether or not to store the job log including confidential information to the agent (Yes in step S1056 to step S1058). For example, the management screen provider 104 refers to the agent information 166, and transmits, to the agent, information of setting content indicating whether or not to store a job log including confidential information. When an operation of switching the setting of whether or not to store a job log including confidential information is not performed on the agent side, the management screen provider 104 omits the process of step S1058 (No in step S1056).

Subsequently, when the management screen provider 104 receives a request for displaying the report request screen from a device used by a user who has been authenticated, the management screen provider 104 transmits the display data of the report request screen to the device (Yes in step S1060 to step S1062). The report request screen is a screen for accepting a request for a report, and is, for example, a screen including a UI for setting the report format, the aggregation period, and a method of acquiring the report. The report request screen includes a UI for selecting which concealed report or a report including confidential information is to be requested. When a request for displaying the report request screen is not received, the management screen provider 104 omits the process of step S1062 (No in step S1060).

Subsequently, the management screen provider 104 determines whether or not a report has been requested from the device used by the user who has been successfully authenticated (step S1064). When a report is requested, the management screen provider 104 instructs the report outputter 108 to output the report. When the output of a report is instructed, the report outputter 108 generates a concealed report (Yes in step S1064 to step S1066). Here, the report outputter 108 generates a concealed report based on the concealed job log. Here, since the confidential information is concealed in the concealed job log, the report outputter 108 can generate a report including information (identification information) obtained by concealing the confidential information by aggregating information included in the concealed job log or extracting information to be included in the report.

Subsequently, the report outputter 108 determines whether or not the requested report is a report including confidential information (step S1068).

When the requested report is a report including confidential information, the report outputter 108 refers to the agent information 166, transmits the concealed report generated in step S1066 to the agent, and requests the issuance of a report including confidential information (Yes in step S1068 to step S1070).

When redirect information is received from the agent, the report outputter 108 transmits the redirect information to the device that has requested the report (step S1072). As a result, the report outputter 108 can display (output) the report including confidential information outputted via the agent, on (to) the device used by the user who has been authenticated. The report may be outputted by displaying the report or may be outputted by transmitting a file of the report or making the file downloadable.

On the other hand, when the requested report is a concealed report, the report outputter 108 transmits (outputs) the concealed report generated in step S1066 to the device that has requested the report (No in step S1068 to step S1074). In this way, the report outputter 108 can display (output) the concealed report on the device used by the user who has been successfully authenticated.

1.3.3. Process Executed by Terminal Device

Figure 14:
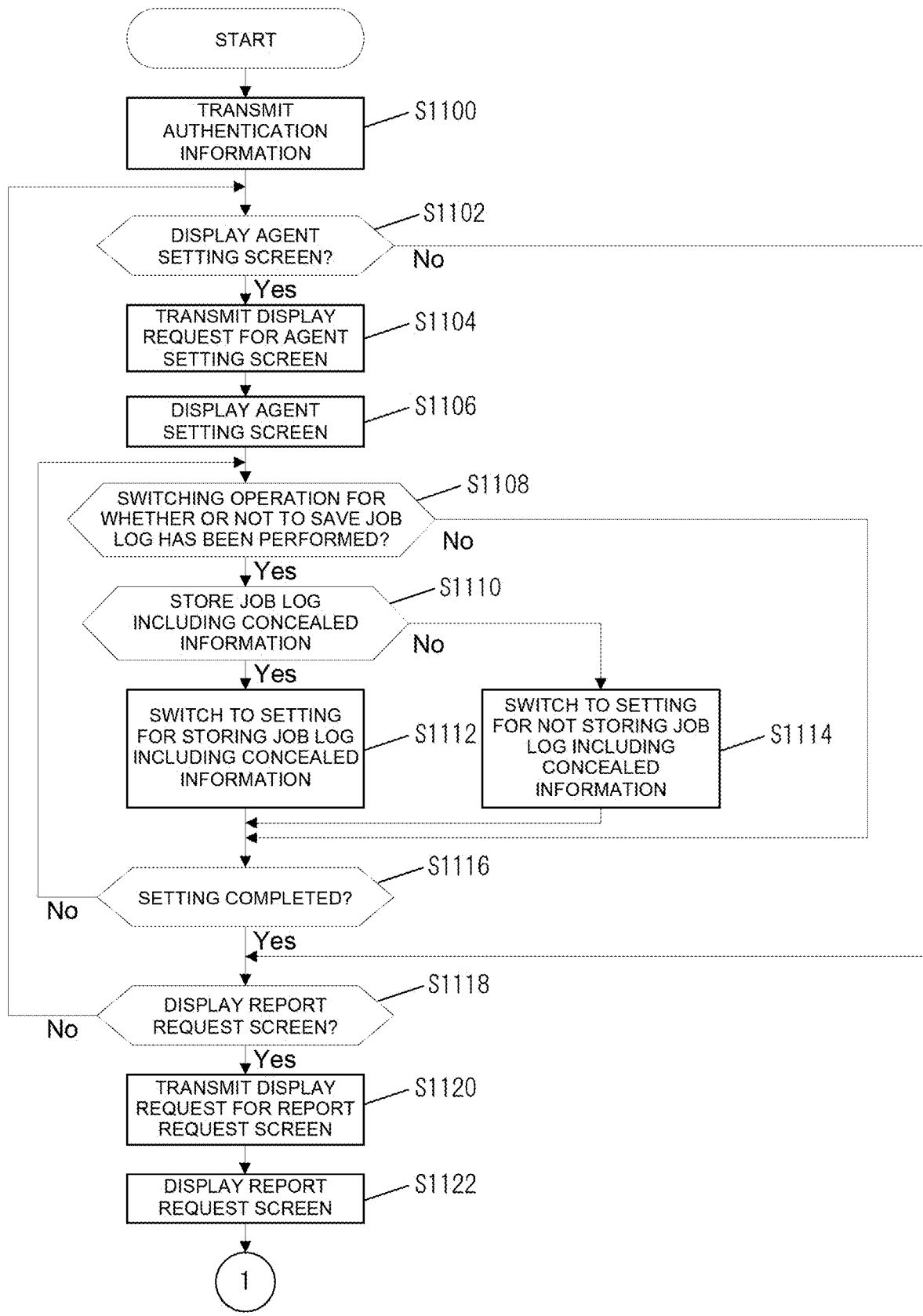
FIG. 14 is a flowchart of a main process executed by the terminal device according to the first embodiment.
Figure 15:
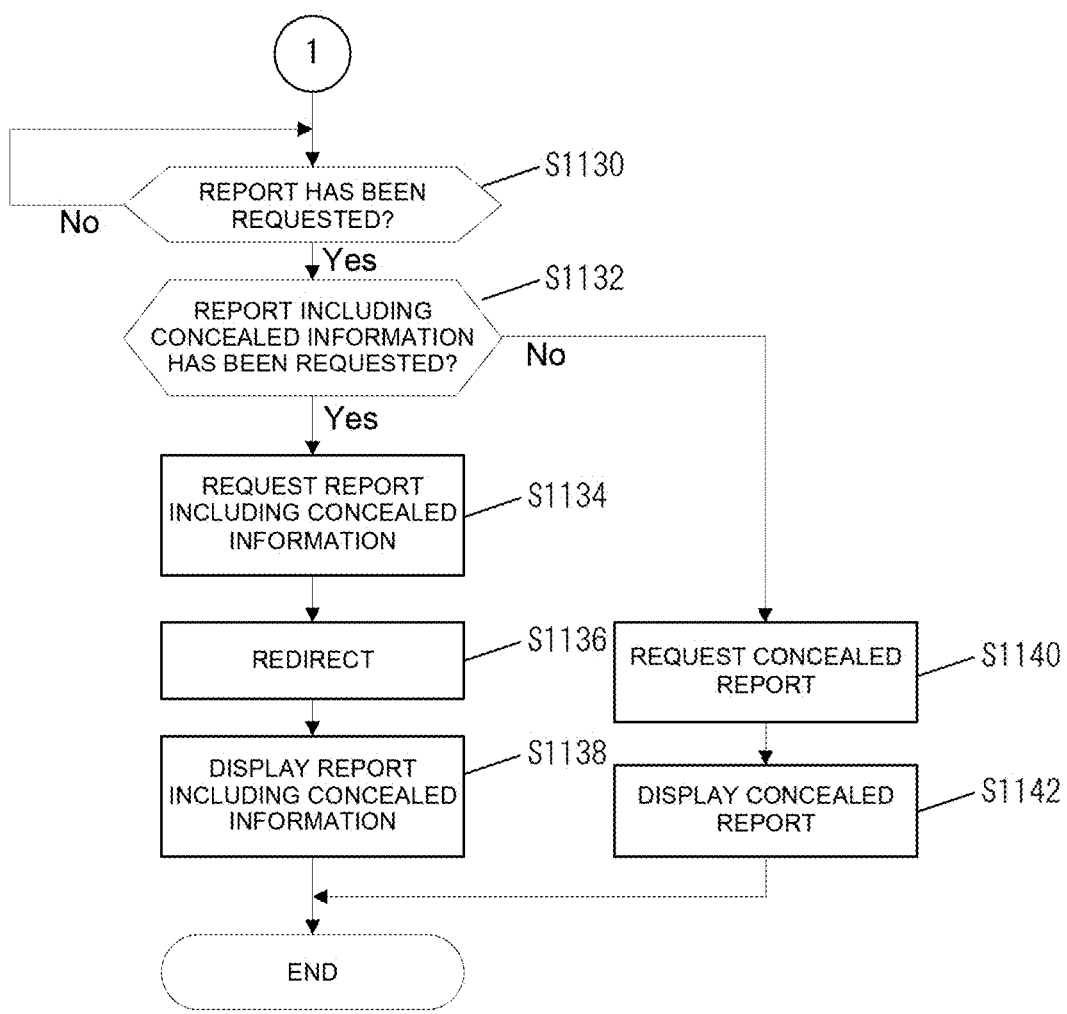
FIG. 15 is a flowchart of a main process executed by the terminal device according to the first embodiment.

FIGS. 14 and 15 are flowcharts illustrating a flow of an essential process (main process) executed by the terminal device 20. The processes illustrated in FIGS. 14 and 15 are executed by the terminal device 20 when the user performs an operation to use the management service.

First, the process illustrated in FIG. 14 will be explained. First, the web browser 202 transmits authentication information to the server device 10 (step S1100). For example, the web browser 202 receives display data of an authentication screen from the server device 10 and displays the authentication screen based on the received display data. The web browser 202 transmits the authentication information inputted by the user via the authentication screen to the server device 10. When display data from the server device 10 is received after transmission of the authentication information, the web browser 202 may display a screen (for example, a menu screen) based on the display data.

Subsequently, when the user performs an operation to display the agent setting screen, the web browser 202 transmits a request for displaying the agent setting screen to the server device 10 (Yes in step S1102 to step S1104). In this case, since the display data of the agent setting screen is transmitted when the server device 10 executes the process of step S1054 in FIG. 13, the web browser 202 receives the display data and displays the agent setting screen based on the display data (step S1106).

Subsequently, when the user performs an operation to switch whether or not to store a job log including confidential information on the agent side, the web browser 202 determines whether or not the setting to store the job log including confidential information is established (Yes in step S1108 to step S1110). When a setting to store the job log on the agent side is established, the web browser 202 switches the setting of the server device 10 to the setting of storing the job log including confidential information on the agent side (Yes in step S1110 to step S1112). For example, the web browser 202 transmits, to the server device 10, information including setting content indicating that the job log including confidential information is to be stored on the agent side. Meanwhile, when a setting to not store the job log including confidential information on the agent side is established, the web browser 202 switches the setting of the server device 10 to the setting of not storing the job log including confidential information on the agent side (No in step S1110 to step S1114). For example, the web browser 202 transmits, to the server device 10, information including setting content indicating that the job log including confidential information is not stored on the agent side. When an operation of switching whether or not to store a job log including confidential information on the agent side, the web browser 202 omits the process from steps S1110 to S1114 (No in step S1108).

Subsequently, the web browser 202 determines whether or not the setting related to the agent is completed (step S1116). When the setting related to the agent is not completed, the web browser 202 causes the process to return to step S1108 (No in step S1116 to step S1108).

When the setting related to the agent is completed (Yes in step S1116) or when it is determined that an operation for displaying the agent setting screen is not performed in step S1102 (No in step S1102), the web browser 202 determines whether or not the user has performed an operation for displaying the report request screen (step S1118).

When an operation for displaying the report request screen is not performed, the web browser 202 causes the process to return to step S1102 (No in step S1118 to step S1102). Meanwhile, when an operation for displaying the report request screen is performed, the web browser 202 transmits a request for displaying the report request screen to the server device 10 (Yes in step S1118 to step S1120). In this case, since the display data of the report request screen is transmitted when the server device 10 executes the process of step S1062 in FIG. 13, the web browser 202 receives the display data and displays the report request screen based on the display data (step S1122). As explained above, the report request screen includes a UI for selecting which concealed report or a report including confidential information is to be requested. That is, the web browser 202 displays whether to request a concealed report or to request a report including confidential information in a selectable manner.

Subsequently, the processing illustrated in FIG. 15 will be described. The web browser 202 determines whether or not the user has requested a report via the report request screen (step S1130). When the report is not requested, the web browser 202 repeats the process of step S1130 (No in step S1130).

Meanwhile, when the report is requested, the web browser 202 determines whether or not the user has requested the report including confidential information (Yes in step S1130 to step S1132).

When the report including confidential information is requested, the web browser 202 requests the report including confidential information to the server device 10 (Yes in step S1132 to step S1134). In this case, since the redirect information is transmitted when the server device 10 executes the process of step S1072 in FIG. 13, the web browser 202 performs redirection based on the redirect information (step S1136). For example, when URL information is received as the redirect information, the web browser 202 accesses the URL. As a result, the web browser 202 acquires the report including confidential information and displays the report including confidential information (step S1138).

Meanwhile, when a concealed report is requested, the web browser 202 requests the concealed report to the server device 10 (No in step S1132 to step S1140). In this case, since the concealed report is transmitted (outputted) when the server device 10 executes the process of step S1074 in FIG. 13, the web browser 202 acquires the concealed report and displays the concealed report (step S1142).

Figure 16:
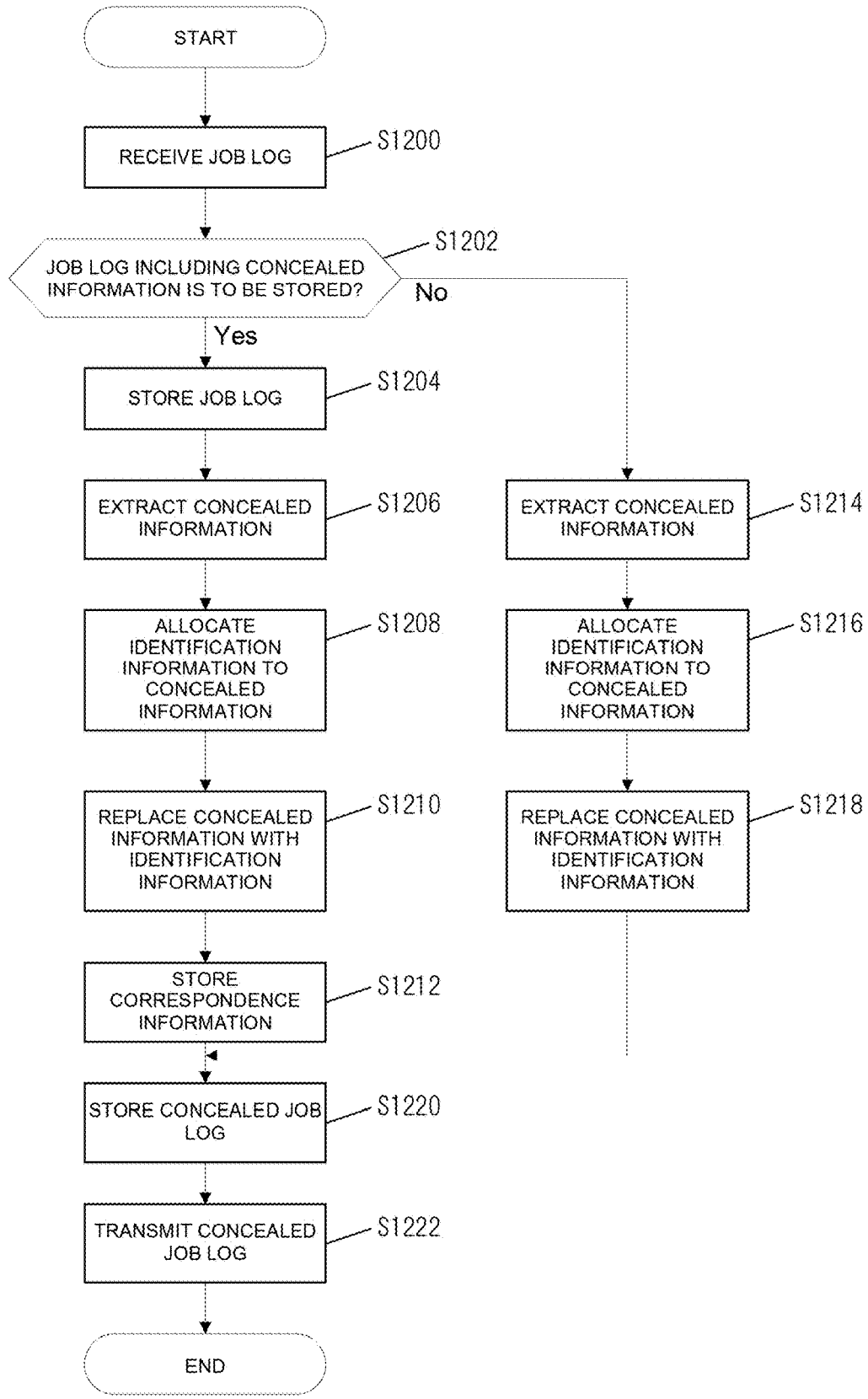
FIG. 16 is a flowchart of a concealed job log transmission process executed by the processing device according to the first embodiment.

1.3.4. Process Executed by Processing Device 1.3.4.1. Concealed Job Log Transmission Process FIG. 16 is a flowchart illustrating a flow of a concealed job log transmission process executed by the processing device 30. The job log transmission process is executed by the concealed-job-log transmitter 3020. The concealed-job-log transmitter 3020 may execute the process illustrated in FIG. 16 periodically or when a concealed job log is requested by the server device 10.

First, the concealed-job-log transmitter 3020 receives a job log from the image forming device 40 (step S1200). For example, the concealed-job-log transmitter 3020 acquires the job log from the image forming device 40 by referring to the target device information 366 and requesting the image forming device 40 to transmit the job log.

Subsequently, the concealed-job-log transmitter 3020 refers to the setting table 368 and determines whether or not a setting to store a job log including confidential information has been established (step S1202).

When a setting to store a job log including confidential information is established, the concealed-job-log transmitter 3020 stores the job log received in step S1200 in the job-log storage area 374 (Yes in step S1202 to step S1204).

Subsequently, the concealed-job-log transmitter 3020 extracts the confidential information included in the job log (step S1206). For example, the concealed-job-log transmitter 3020 extracts, as confidential information, an item value associated with the item name of a specific item to be concealed and a character string matching the pattern of the character string of the content to be concealed, from the content included in the job log. As a result, the concealed-job-log transmitter 3020 extracts, from the job log, the contents set as the contents of the confidentiality target, such as the user name of the user who executed the job and information of the communication destination. Furthermore, the concealed-job-log transmitter 3020 allocates identification information to the extracted confidential information (step S1208). For example, when the correspondence information including the extracted confidential information is stored in the correspondence-information storage area 370, the concealed-job-log transmitter 3020 allocates the identification information included in the correspondence information to the confidential information. That is, when there is already identification information corresponding to the confidential information, the concealed-job-log transmitter 3020 may allocate the identification information to the confidential information. On the other hand, when the correspondence information including the extracted confidential information is not stored in the correspondence-information storage area 370, the concealed-job-log transmitter 3020 newly allocates identification information corresponding to the confidential information. The identification information may be, for example, a character string obtained from the confidential information by a predetermined method, such as a hash value generated on the basis of the confidential information, a serial number, or a random character string.

Subsequently, the concealed-job-log transmitter 3020 replaces the confidential information included in the job log with the identification information allocated in step S1208 (step S1210). Furthermore, when identification information corresponding to the confidential information is newly allocated in step S1208, the concealed-job-log transmitter 3020 stores correspondence information including the confidential information and the identification information in the correspondence-information storage area 370 (step S1212). In this way, the concealed-job-log transmitter 3020 stores the confidential information and the identification information in association with each other as correspondence information.

On the other hand, when it is determined in step S1202 that the setting to store the job log including confidential information is not established, the concealed-job-log transmitter 3020 extracts the confidential information included in the job log received in step S1200 (No in step S1202 to step S1214). The process of step S1214 is the same as that of step S1206. Furthermore, the concealed-job-log transmitter 3020 allocates identification information to the extracted confidential information (step S1216) and replaces the confidential information included in the job log with the identification information allocated in step S1216 (step S1218). Here, the concealed-job-log transmitter 3020 can allocate the same identification information to the same confidential information by fixing the encryption method or function used to derive the identification information in step S1216. At this time, the concealed-job-log transmitter 3020 uses, for example, information of a tenant (for example, a tenant ID) that uses the management service as a parameter (an encryption key or the like) for an encryption method or function, so that each tenant can use a different encryption method or function. As a result, even if the information stored in the agent is leaked to the outside, the confidential information can be at least made into meaningless information.

In this way, the concealed-job-log transmitter 3020 can convert a job log into a concealed job log (generate a concealed job log) by executing the process of step S1210 or step S1218. Subsequently, the concealed-job-log transmitter 3020 stores the concealed job log (step S1220). Furthermore, the concealed-job-log transmitter 3020 refers to the server device information 364 and transmits the concealed job log to the server device 10 (step S1222).

1.3.4.2. Agent-Side Report Output Process

Figure 17:
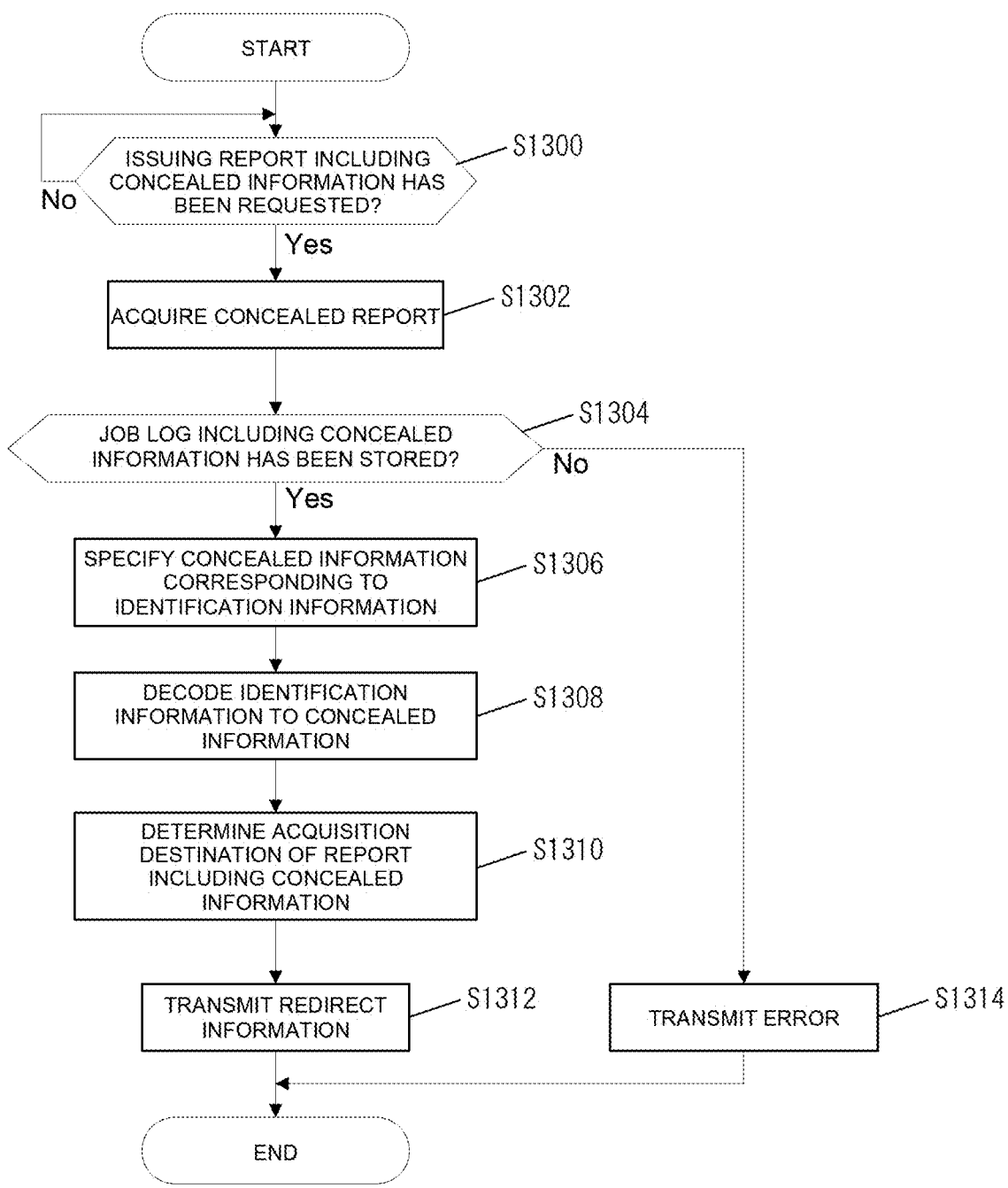
FIG. 17 is a flowchart illustrating a flow of an agent-side report output process executed by the processing device according to the first embodiment.

FIG. 17 is a flowchart illustrating the flow of an agent-side report output process executed by the processing device 30. The agent-side report output process is executed by the report outputter 3022.

First, the report outputter 3022 determines whether or not issuance of a report including confidential information has been requested by the server device 10 (step S1300). When the issuance of a report including confidential information is not requested, the report outputter 3022 repeats the process of step S1300 (No in step S1300).

Meanwhile, when the issuance of a report including confidential information is requested, the report outputter 3022 acquires a concealed report (Yes in step S1300 to step S1302). Here, since the concealed report is transmitted from the server device 10 by the server device 10 executing the process of step S1070 in FIG. 13, the report outputter 3022 may receive and acquire the concealed report.

Subsequently, the report outputter 3022 refers to the setting table 368 and determines whether or not a setting to store a job log including confidential information has been established (step S1304).

When a setting to store the job log including confidential information established, the report outputter 3022 specifies the confidential information corresponding to the identification information included in the concealed report acquired in step S1302 (Yes in step S1304 to step S1306). For example, for each piece of identification information included in the concealed report, the concealed-job-log transmitter 3020 reads the correspondence information including the identification information from the correspondence-information storage area 370, and specifies the confidential information included in the read correspondence information as the confidential information corresponding to the identification information.

Subsequently, the report outputter 3022 decrypts (replaces) the identification information included in the concealed report into (with) the corresponding confidential information (step S1308). In this way, the report outputter 3022 can replace the concealed report with a report including confidential information. That is, the report outputter 3022 can add confidential information to the concealed report and generate a report including the confidential information.

Subsequently, the report outputter 3022 determines an acquisition destination of the report including the confidential information (step S1310). The acquisition destination of the report including the confidential information is indicated by, for example, a URL or information of a location (file path or the like) where the report is stored. For example, the report outputter 3022 stores the report including the confidential information in the storage 360, and sets the file path or the URL of the report including the confidential information as the acquisition destination of the report including the confidential information.

Here, the report outputter 3022 can output (download) the report including the confidential information via the agent by setting the acquisition destination of the report including the confidential information to the processing device 30. Since the report outputter 3022 outputs the report including the confidential information via the agent, only the device connected to the same network as the network (network NW1) to which the processing device 30 is connected can acquire the report including the confidential information. The report outputter 3022 may be another device connected to the same network as the network (network NW1) to which the processing device 30 is connected. Also in this case, it is possible to cause only a device connected to the same network as the network to which the processing device 30 is connected to acquire the report including the confidential information. In this way, the report outputter 3022 can prevent the report including the confidential information from being transmitted to an external network.

Subsequently, the report outputter 3022 transmits redirect information to the server device 10 (step S1312). The redirect information includes information on the acquisition destination of the report including the confidential information. In this way, the report outputter 3022 transmits the redirect information to the server device 10 as a response to the request for the report including the confidential information from the server device 10.

When it is determined in step S1304 that the setting to store a job log including confidential information is not established, the report outputter 3022 transmits an error to the server device 10 so as not to output the report including the confidential information (No in step S1304 to step S1314). That is, in this case, the report outputter 3022 restricts the output of the report including the confidential information.

1.3.5. Process Executed by Image Processing Device

The controller 400 of the image forming device 40 executes a job on the basis of a user operation. When the execution of the job is completed, the controller 400 stores the job log of the executed job in the job-log storage area 464. In order to specify the user who has performed the operation, the controller 400 may authenticate the user who operates the image forming device 40 on the basis of the user information, and then accept the operation for executing the job. In this case, the controller 400 stores the authenticated user in the job log as the user who executed the job.

When a job log is requested by the agent, the job log transmitter 404 transmits the job log to the processing device 30 running the agent.

1.4. Operation Example 1.4.1. Agent Setting Screen

Figure 18:
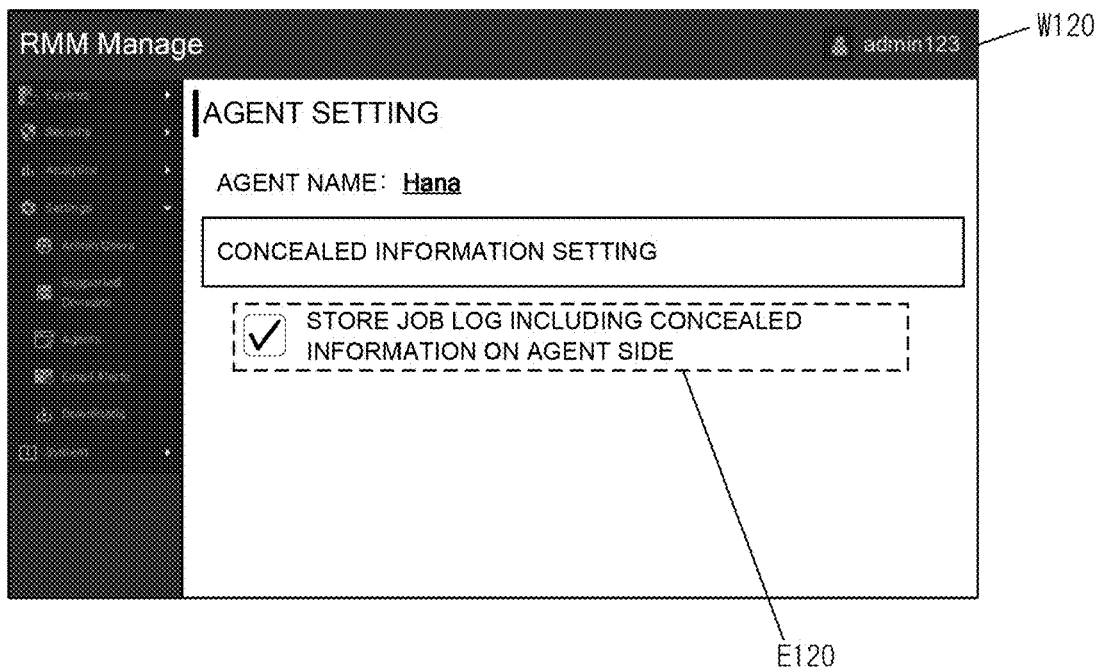
FIG. 18 is a diagram illustrating an operation example according to the first embodiment.

FIG. 18 is a diagram illustrating a screen example of an agent setting screen W120. The agent setting screen W120 includes, for example, a check box E120 for setting whether or not to store a job log including confidential information on the agent side. The user can switch whether or not to store a job log including confidential information on the agent side by selecting the check box E120.

1.4.2. Report Request Screen

Figure 19:
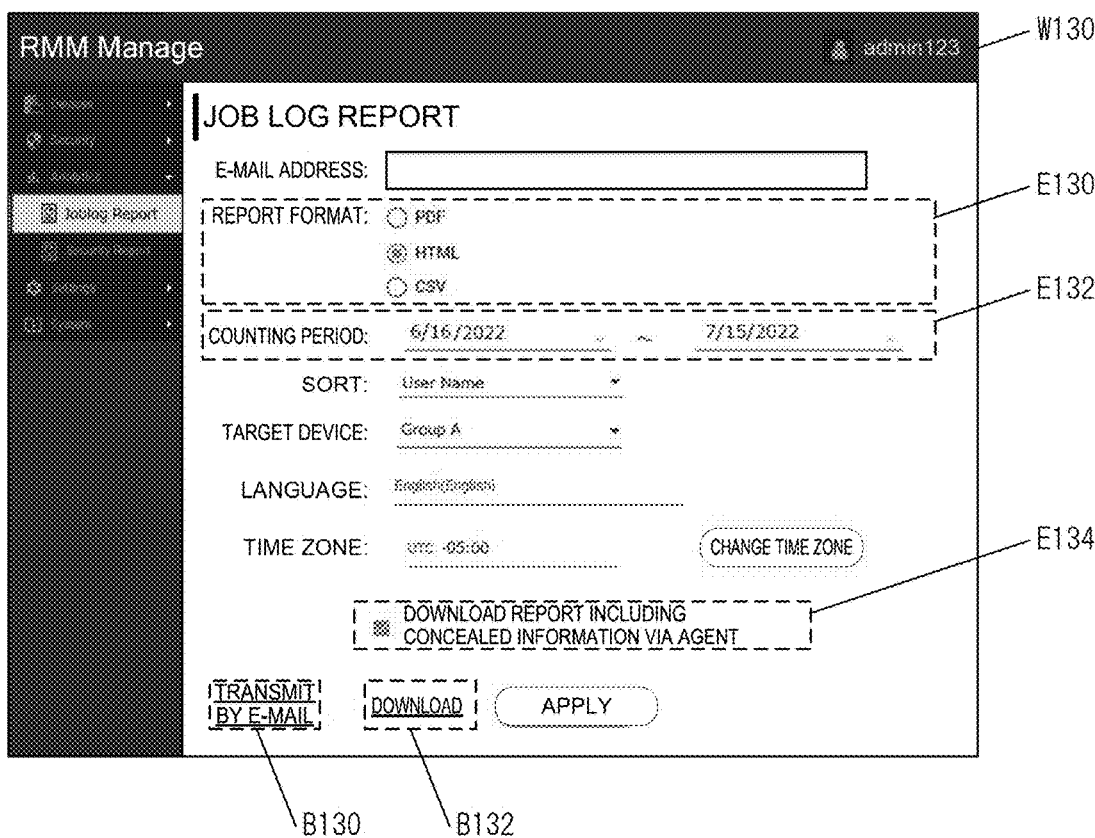
FIG. 19 is a diagram illustrating an operation example according to the first embodiment.

FIG. 19 is a diagram illustrating a screen example of a report request screen W130. The report request screen W130 includes, for example, an area E130 for setting the format (file format) of a report and an area E132 for setting the aggregation period. The report request screen W130 may include a UI for setting the language of a report, a sorting target of a report, and the image forming device 40 that is a target of aggregation.

The report request screen W130 includes an area E134 for selecting whether or not to download a report including confidential information via the agent. The user can acquire a report including confidential information by selecting to download a report including confidential information via the agent. On the other hand, the user can acquire a concealed report by not selecting to download a report including confidential information via the agent. In this way, on the report request screen, whether or not the confidential information stored on the agent side is added to the requested report, that is, whether to request a report including confidential information or request a concealed report is displayed in a selectable manner.

The report request screen W130 may include a button B130 for instructing the transmission of a report by E-mail (electronic mail) and a button B132 for instructing the download of a report on the spot. When the transmission of the report by E-mail is instructed, the server device 10 may transmit E-mail including a URL or a file path with which the report can be acquired or viewed, to the user who has requested the report as a transmission destination. In this case, when the report requested by the user is a concealed report, the server device 10 may transmit an E-mail to which the concealed report is attached to the user who has requested the report as a transmission destination.

Figure 20A:
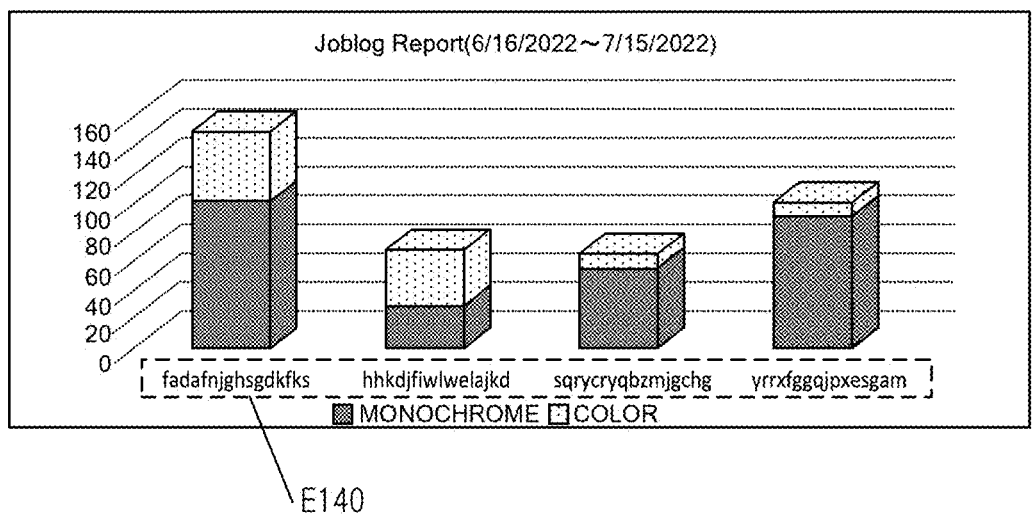
FIGS. 20A and 20B are diagrams illustrating operation examples according to the first embodiment.
Figure 20B:
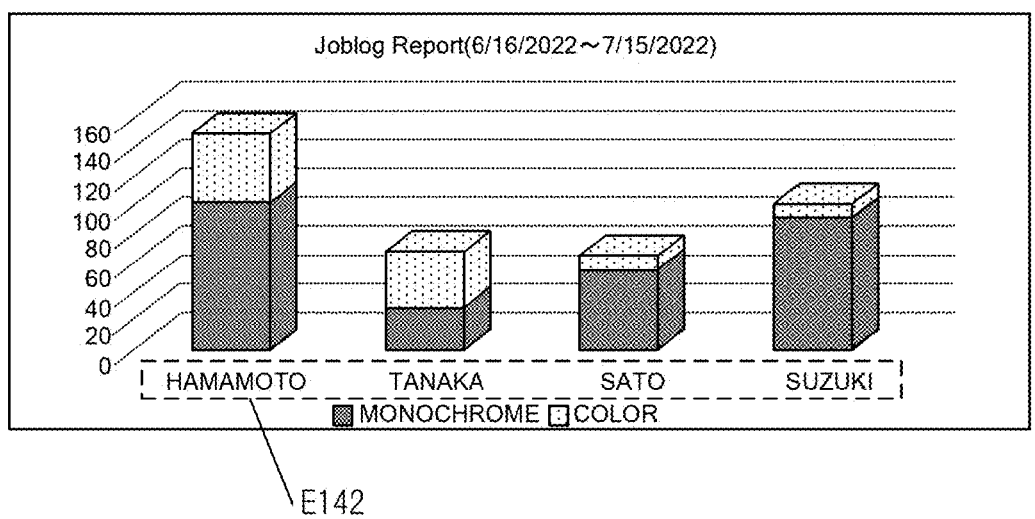

FIGS. 20A and 20B are diagrams illustrating examples of a report to be output. FIG. 20A is a diagram illustrating an example of a concealed report. As illustrated in FIG. 20A, confidential information such as a user name is concealed in the concealed report (for example, E140). FIG. 20B is a diagram illustrating an example of a report including confidential information. As illustrated in FIG. 20B, the report including confidential information includes confidential information such as a user name (for example, E142). The user can select and acquire a concealed report and a report including confidential information.

In the above description, the terminal device 20 are connected to the network NW1. In this case, when a report including confidential information is requested and the acquisition destination of the report is the processing device 30, the terminal device 20 can acquire the report by connecting to the processing device 30. On the other hand, the terminal device 20 may be connected to the network NW2. In this case, when a report including confidential information is requested and the acquisition destination of the report is the processing device 30, a report including confidential information cannot be acquired because the terminal device 20 connected to the network NW2 cannot be directly connected to the network NW1.

In the above description, the target device is the image forming device 40. However, the target device may be a display device that displays digital signage, or a so-called Internet of things (IoT) product. That is, the target device may be a device capable of transmitting a job log to the processing device 30. Alternatively, the target device may be any information processing device of a specific type (for example, an image forming device) connected to the network NW1, or may be a portion of the information processing device of the specific type.

Whether or not a report including confidential information can be output may be switched according to a contract with the user who is using the management service. For example, the function of outputting a report including confidential information may be a paid function. In this case, before the contract for using the function of outputting a report including confidential information is made, the processing device 30 outputs a report including confidential information is kept confidential even when the report including confidential information is requested. On the other hand, after the contract for using the function of outputting a report including confidential information is made, the processing device 30 outputs a report including confidential information when the report including confidential information is requested. Whether or not a contract is made may differ for each user who is using the management service.

In the above description, the agent is run by the processing device 30. However, the agent may be run by a target device (the image forming device 40). In this case, the target device running the agent may acquire a job log of the host device in addition to a job log of a target device, and may transmit a concealed job log based on the acquired job log to the server device 10. The job log may be unilaterally transmitted from the target device to the processing device 30 without receiving a request from the processing device 30. In this case, the target device may preliminarily store information (for example, an IP address or a port number) of the processing device 30.

In the above description, the server device 10 generates a concealed report. Alternatively, the processing device 30 may generate a concealed report. In this case, the server device 10 may request a concealed report from the processing device 30, acquire the concealed report generated by the processing device 30, and then output the concealed report to the terminal device 20. Furthermore, the processing device 30 may generate a report including confidential information by using a job log including confidential information, instead of generating a report including confidential information by replacing identification information included in a concealed report received from the server device 10 with corresponding confidential information. In this case, in step S1070 of FIG. 13, the server device 10 may only request the processing device 30 for a report including confidential information.

As described above, in the system according to the present embodiment, device information such as a job log related to a device such as an image forming device connected in a company network is transmitted to a server device constructed on a cloud (external network) via an agent ran in the company network. Here, the device information including confidential information such as personal information and the device information obtained by concealing the confidential information are stored on the agent side, and only the device information obtained by concealing the confidential information is transmitted to the cloud side. When a report including confidential information such as personal information is generated, aggregation or the like is performed on the cloud side, and the confidential information stored on the agent side is added to a concealed report that is the aggregation result, thereby generating a report including the confidential information. Since the report including the confidential information is redirected from a management screen, the user can acquire the report including the confidential information only by operating the management screen provided by the server device via the terminal device. On the other hand, device information including confidential information such as personal information is not transmitted to an external network. Accordingly, the system of the present embodiment can appropriately generate and output a report including confidential information, and generate and output a concealed report via a cloud (cloud application).

Unlike the conventional techniques, the system according to the present embodiment allows the agent to store (accumulate) confidential information such as personal information, to select whether to request a concealed report or to request a report including confidential information, and to add confidential information to a report when a report including confidential information is requested. In this way, the system according to the present embodiment can generate and output a report including confidential information by using a cloud application without transmitting device information such as a job log including confidential information such as personal information to an external network.

2. Second Embodiment

The second embodiment is an embodiment in which the image forming device according to the first embodiment does not store a job log. In the present embodiment, FIG. 9 of the first embodiment is replaced with FIG. 21, and FIG. 16 of the first embodiment is replaced with FIG. 23, respectively. The same numeral or symbol is attached to the same functional portions and processes, and description thereof will be omitted.

2.1. Functional Configuration

Figure 21:
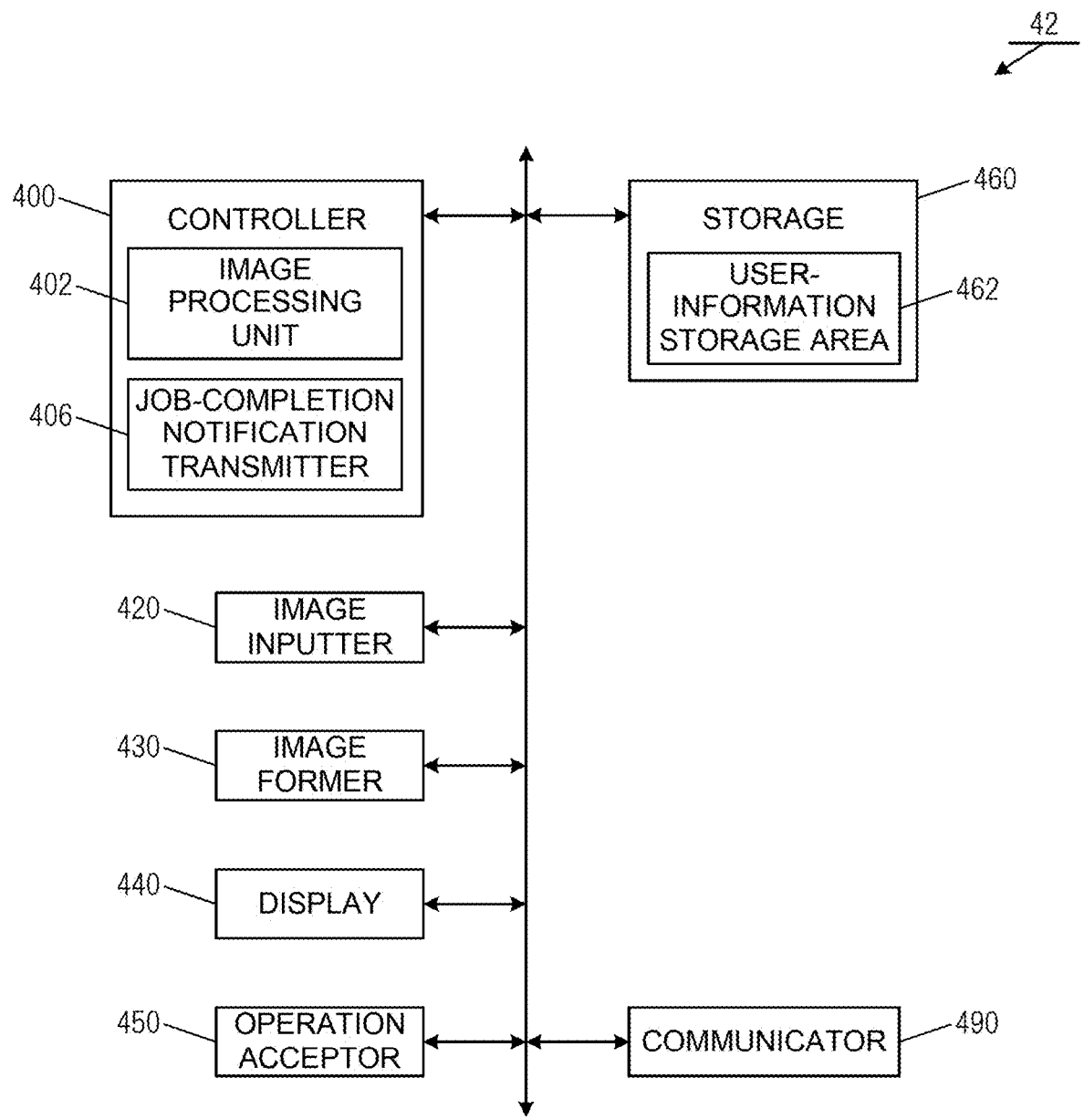
FIG. 21 is a diagram illustrating a functional configuration of an image forming device according to a second embodiment.

In the present embodiment, the system 1 illustrated in FIG. 1 includes an image forming device 42 in place of the image forming device 40. FIG. 21 is a diagram illustrating a functional configuration of the image forming device 42. The image forming device 42 is different from the image forming device 40 in that the controller 400 also functions as a job-completion notification transmitter 406 and that a job-log storage area 464 is not reserved in the storage 460. In the image forming device 42, the controller 400 may not function as the job log transmitter 404.

When the execution of a job is completed, the job-completion notification transmitter 406 transmits a job completion notification, which is a notification indicating that the execution of the job is completed, to an agent (the processing device 30). Information (for example, an IP address or a port number) of an agent that is a transmission destination of the job completion notification may be transmitted from a printer driver of the device that has transmitted a job such as printing to the image forming device 42, to the image forming device 42. In this case, the job-completion notification transmitter 406 can transmit a job completion notification to the agent by acquiring information on the agent from the printer driver. The information on the agent may be preliminarily stored in the image forming device 42.

Furthermore, the job-completion notification transmitter 406 may transmit the job completion notification to the agent by broadcasting the job completion notification to a network to which the image forming device 42 is connected. The job completion notification may include, for example, information such as the user name of the user who executed the job, the type of the executed job, the setting contents of the executed job, communication destination information, the number of sheets printed or transmitted, and the execution time of the job. The job completion notification may include information indicating the state and setting content of a target device, or may include information unique to the target device (model name, series name, serial number, etc).

2.2. Process Flow 2.2.1. Outline of Process

Figure 22:
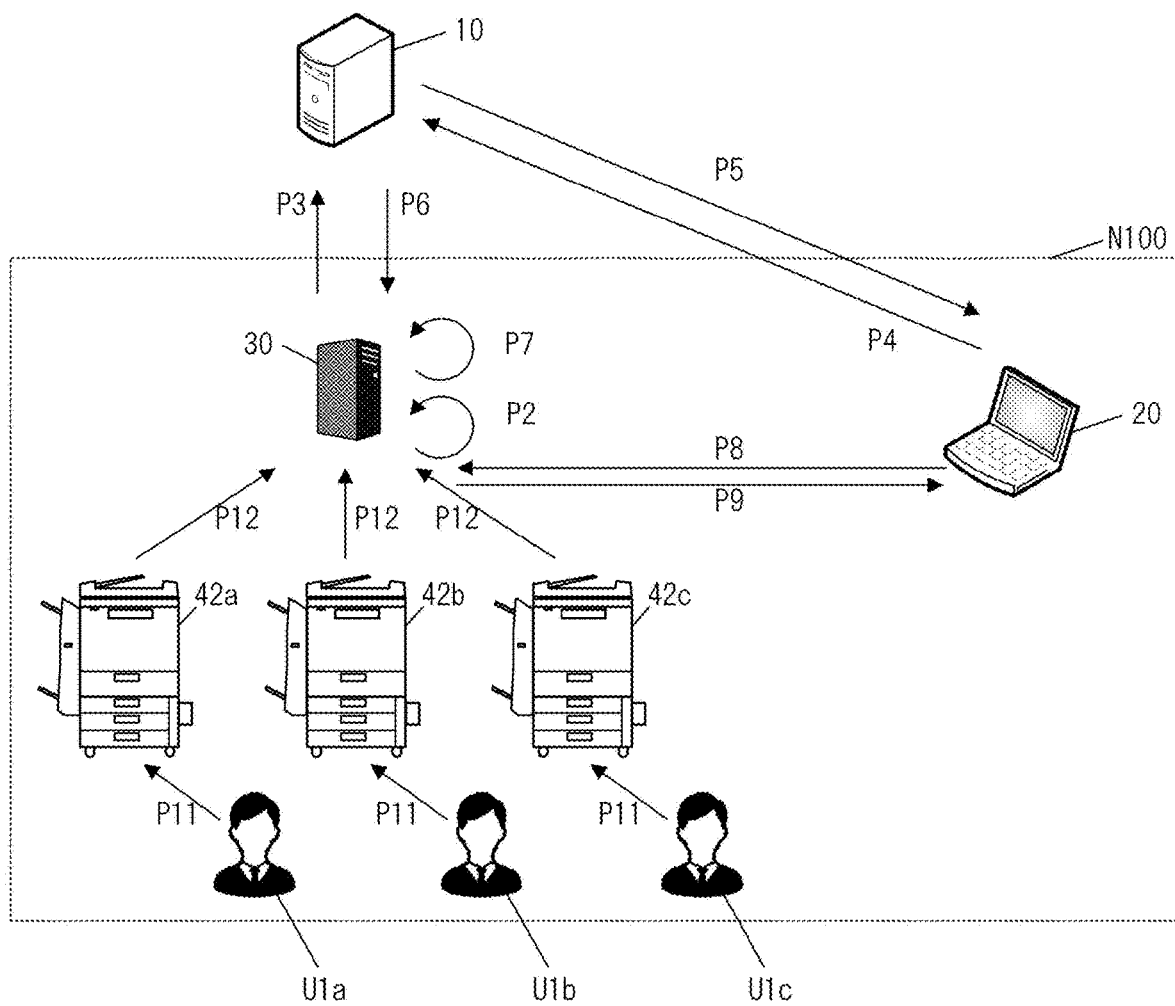
FIG. 22 is a diagram illustrating an outline of a process according to the second embodiment.

FIG. 22 is a diagram illustrating an overview of a process executed by each device included in the system 1 according to the present embodiment. First, the image forming device 42 executes a job in response to a user operation (P11). When the execution of the job is completed, the image forming device 42 broadcasts a job completion notification (P12). In this way, the job completion notification is received by the processing device 30. For example, when a job is executed in an image forming device 42a in response to an operation by a user U1a, the image forming device 42a transmits a job completion notification. Similarly, when a job is executed by an image forming device 42b in response to an operation of a user U1b, the image forming device 42b transmits a job completion notification. When a job is executed by an image forming device 42c in response to an operation of a user U1c, the image forming device 42c transmits a job completion notification.

The processing device 30 receives the job completion notifications and generates a job log on the basis of the content of the job completion notifications. In this way, the processing device 30 acquires a job log of the image forming devices 42 on the basis of the content of the job completion notifications. The process executed by each device included in the system 1 after the processing device 30 acquires a job log of the image forming devices 42 is the same as the process from P2 to P9 in FIG. 11, and therefore the same reference symbols as those in FIG. 11 are assigned, and description thereof is omitted.

2.2.2. Process Executed by Processing Device

Figure 23:
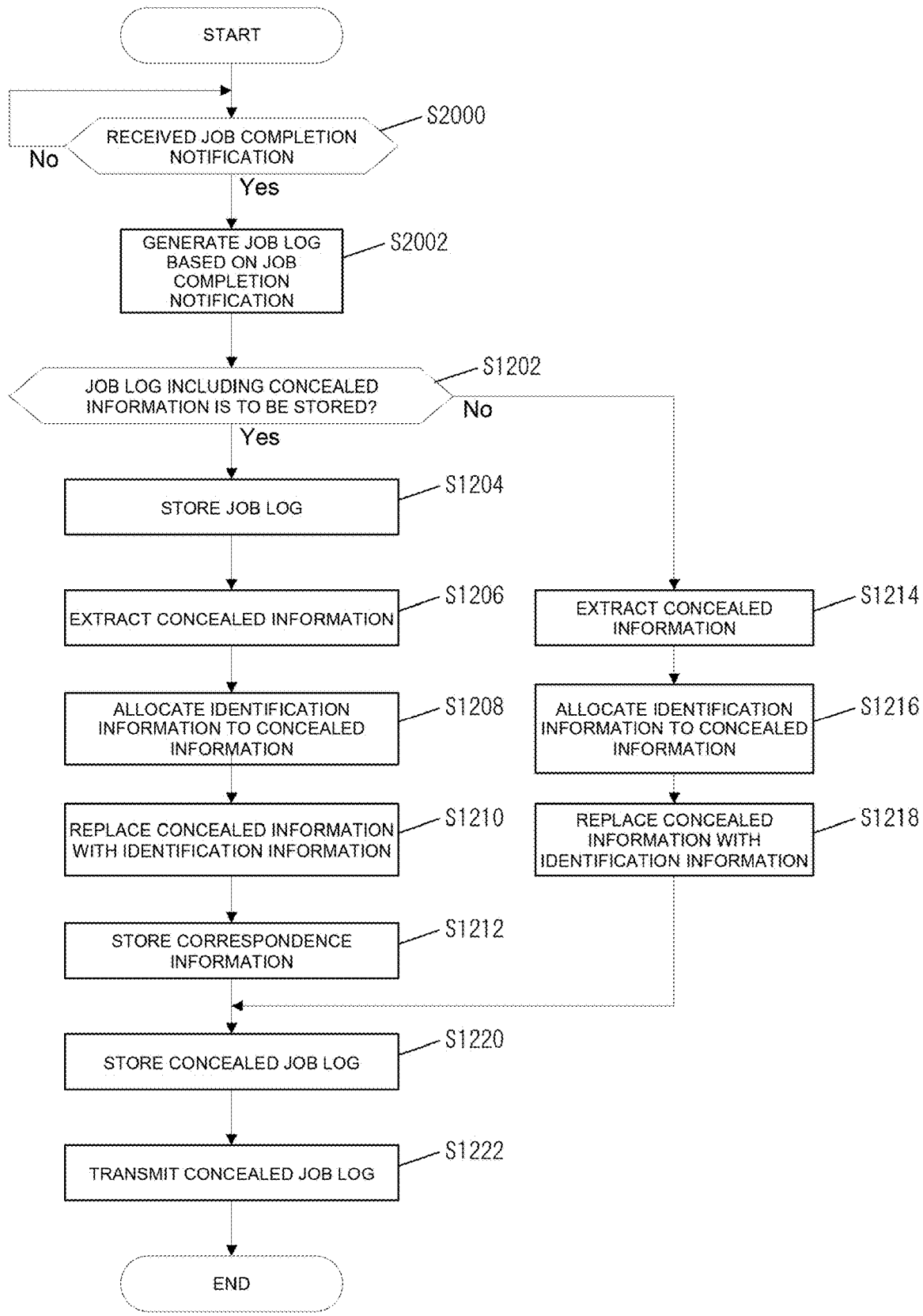
FIG. 23 is a flowchart of a concealed job log transmission process according to the second embodiment.

FIG. 23 is a flowchart illustrating a flow of a job log transmission process executed by the processing device 30 according to the present embodiment. In the present embodiment, when receiving a job completion notification, the report outputter 3022 generates a job log based on the job completion notifications and stores the job log in the job-log storage area 374 (Yes in step S2000 to step S2002). For example, the report outputter 3022 generates and stores a job log by modifying the format of the information included in the job completion notifications into a predetermined job log format. When the job completion notifications are not received, the report outputter 3022 repeats the process of step S2000 (No in step S2000).

2.2.3. Process Executed by Image Forming Device

As described above, when the execution of the job is completed, the job-completion notification transmitter 406 of the image forming device 42 transmits a job completion notification to the agent (the processing device 30).

In this way, in the system according to the present embodiment, even if the target device such as an image forming device is a low-end machine that does not have a function of storing a job log, a report can be output.

3. Third Embodiment

The third embodiment is an embodiment in which the confidential information included in a report differs from that in the process of the first embodiment, when a request for the report including confidential information is made in accordance with the authority of the user who requests the report from the server device 10. In the present embodiment, FIG. 4 of the first embodiment is replaced with FIG. 24, FIG. 6 of the first embodiment is replaced with FIG. 25, FIG. 8 of the first embodiment is replaced with FIG. 26, and FIG. 17 of the first embodiment is replaced with FIG. 28. The same numeral or symbol is attached to the same functional portions and processes, and description thereof will be omitted.

3.1. Functional Configuration

In the present embodiment, the system 1 illustrated in FIG. 1 includes a processing device 32 in place of the processing device 30. Furthermore, the server device 10 is different in that user authority is also stored in the account information.

3.1.1. Server Device

In the present embodiment, as illustrated in FIG. 24, the server device 10 includes, in the account information, an account name, a password, and the authority of the user specified by the account name (for example, "administrator"). For example, any one of "administrator," "service person," and "general" is stored as the information on user authority.

3.1.2. Processing Device

Figure 25:
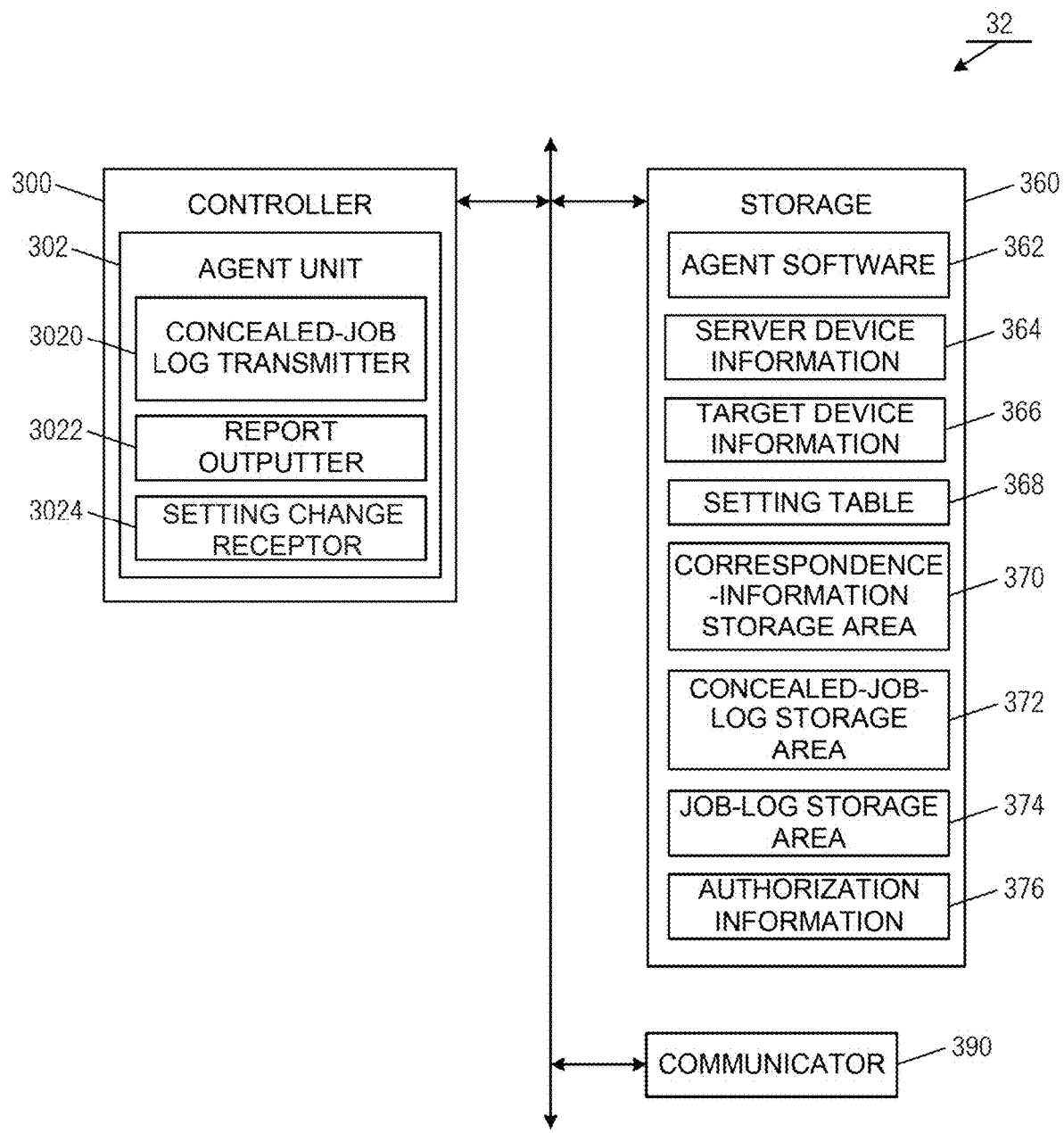
FIG. 25 is a diagram illustrating a functional configuration of a processing device according to the third embodiment.

FIG. 25 is a diagram illustrating a functional configuration of the processing device 32. The processing device 32 is different from the processing device 30 in that authority information 376 is further stored in the storage 360. Furthermore, the processing device 32 is different from the processing device 30 in that the type of confidential information is stored in the correspondence information.

As illustrated in FIG. 26, the correspondence information of the present embodiment includes identification information, confidential information, and a confidential information type (for example, "name") corresponding to the confidential information. As the confidential information type, for example, information for specifying the type of content to be a confidentiality target, such as "name," "facsimile number," and "mail address," is stored.

The authority information 376 is information (table) storing the correspondence between user authority and the type of confidential information to be included in the report. For example, as illustrated in FIG. 27, the authority information 376 stores confidential information type and information indicating whether or not to include the type of confidential information depending on the user authority in association with each other. In the example of FIG. 27, when a request for a report including confidential information is made by a user whose authority is "administrator," the report includes name information but does not include facsimile number information and mail address information (the identification information is not changed). On the other hand, when a request for a report including confidential information is made by a user whose authority is "service person," the report includes name information, facsimile number information, and mail address information.

3.2. Process Flow
3.2.1. Server Device

The server device 10 executes the process illustrated in FIG. 13. In the present embodiment, the user authenticator 102 also acquires information on the authority of the authenticated user in step S1050. When requesting a report including confidential information in step S1070, the report outputter 108 also transmits information on the authority of the user who has requested the report to the agent.

3.2.2. Processing Device

The processing device 32 executes the process illustrated in FIG. 16 as a concealed job log transmission process. In the present embodiment, in step S1212, the concealed-job-log transmitter 3020 specifies the confidential information type and stores correspondence information including identification information, confidential information, and confidential information type. The confidential information type may be associated in advance with, for example, an item name of a specific item to be a confidentiality target or a pattern of a character string of an item value.

Figure 28:
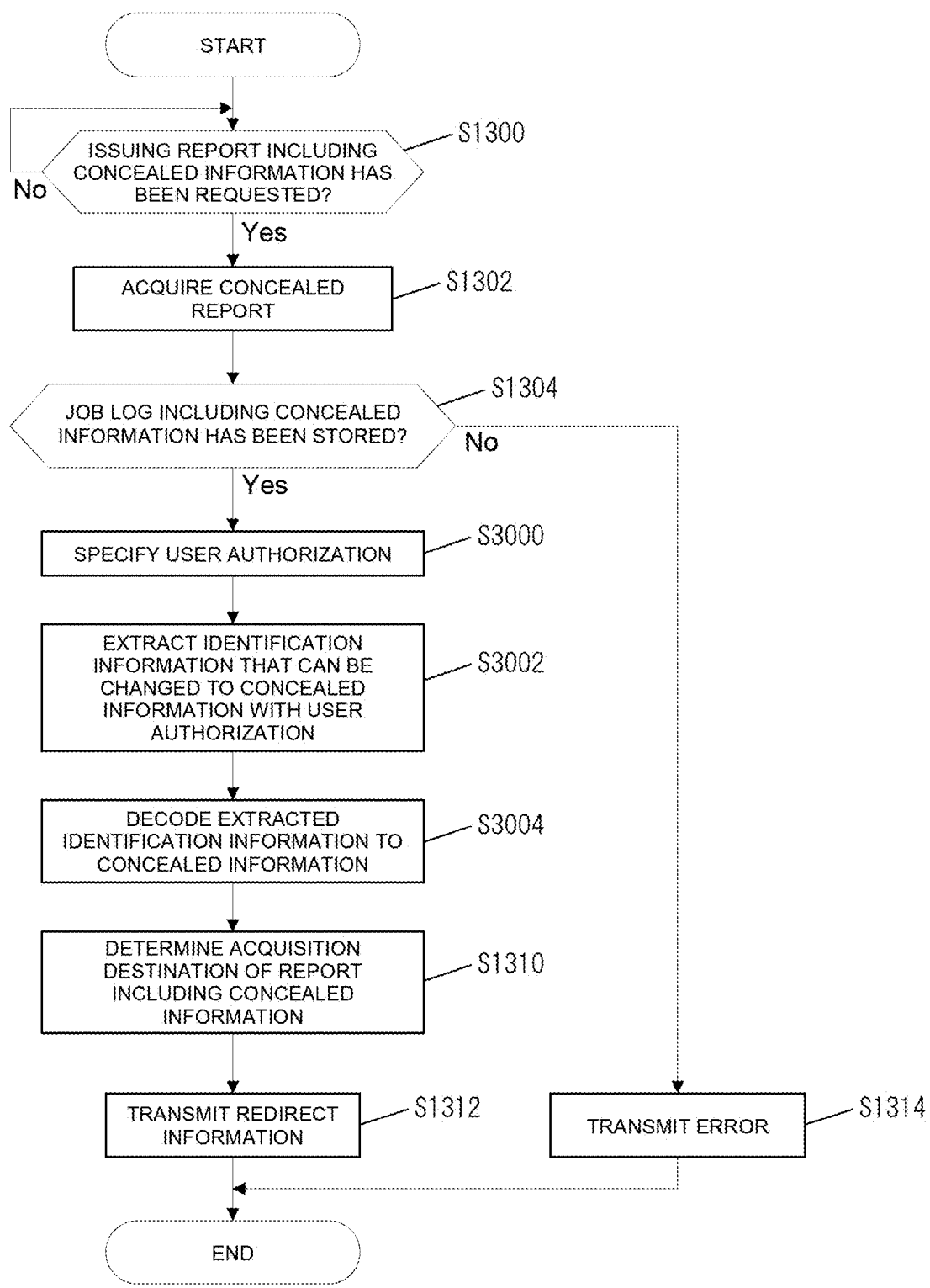
FIG. 28 is a flowchart illustrating a flow of an agent-side report output process executed by the processing device according to the third embodiment.

In the present embodiment in which the processing device 32 executes the process illustrated in FIG. 28 as a report output process on the agent side, the report outputter 3022 specifies the authority of the user that has requested a report including confidential information when a setting to store a job log including confidential information is established (Yes in step S1304 to step S3000). In the present embodiment, as described above, when a report including confidential information is requested by the server device 10, information on the authority of the user who has requested the report is also transmitted. Therefore, the report outputter 3022 may specify the user authority on the basis of the information on the user authority.

Subsequently, the report outputter 3022 extracts identification information which can be replaced with confidential information from the concealed report acquired in step S3000 according to the user authority specified in step S1302 (step S3002). For example, the report outputter 3022 executes the following processes.

(1) The report outputter 3022 acquires the type of the confidential information that can be included according to the user authority specified in step S3000 by referring to the authority information 376.

(2) The report outputter 3022 extracts one piece of identification information included in the concealed report acquired in step S1302 and reads the correspondence information in which the extracted identification information is stored.

(3) When the confidential information type stored in the correspondence information read in process (2) is any one of the confidential information types acquired in (1), the report outputter 3022 extracts the identification information extracted in process (2) as identification information that can be replaced with confidential information.

(4) The report outputter 3022 repeats the processes (2) and (3) explained above until all pieces of identification information included in the concealed report acquired in step S1302 is extracted.

Subsequently, the report outputter 3022 decrypts (replaces) the identification information extracted in step S3002 into (with) the corresponding confidential information (step S3004). In this way, the report outputter 3022 can convert the concealed report into a report including the confidential information by converting the identification information replaceable with the confidential information according to the user authority among the identification information included in the concealed report into the confidential information. Furthermore, the report outputter 3022 outputs a report including confidential information by executing the process of steps S1310 and S1312.

By executing the above-described processing, the report outputter 3022 can replace a portion or all of the identification information included in the concealed report with the confidential information in accordance with the authority of the user who has requested the report including the confidential information. In this way, the report outputter 3022 can determine the confidential information to be included in the report in accordance with the authority of the user who has requested the report including the confidential information and can include the confidential information in the report.

3.3. Operation Example

Figure 29A:
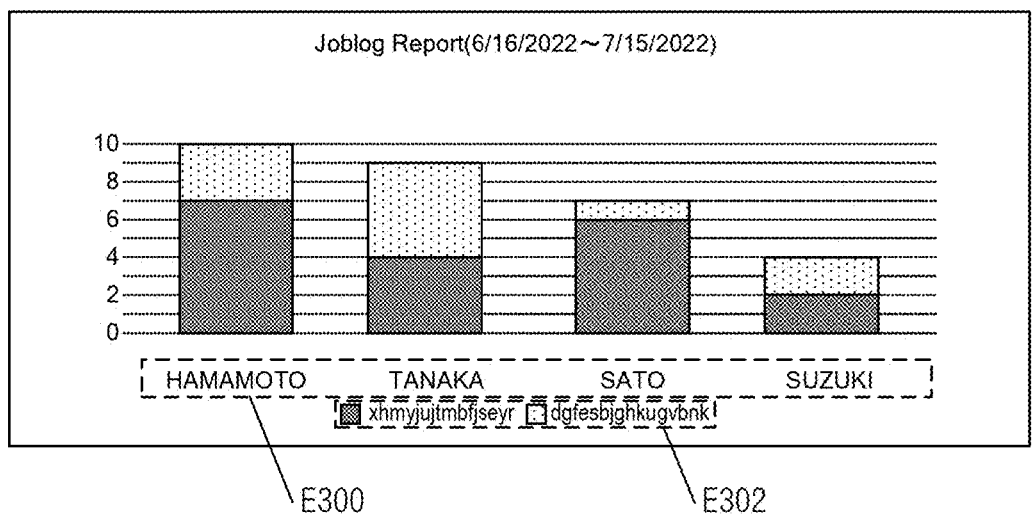
FIGS. 29A and 29B are diagrams illustrating operation examples according to the third embodiment.
Figure 29B:
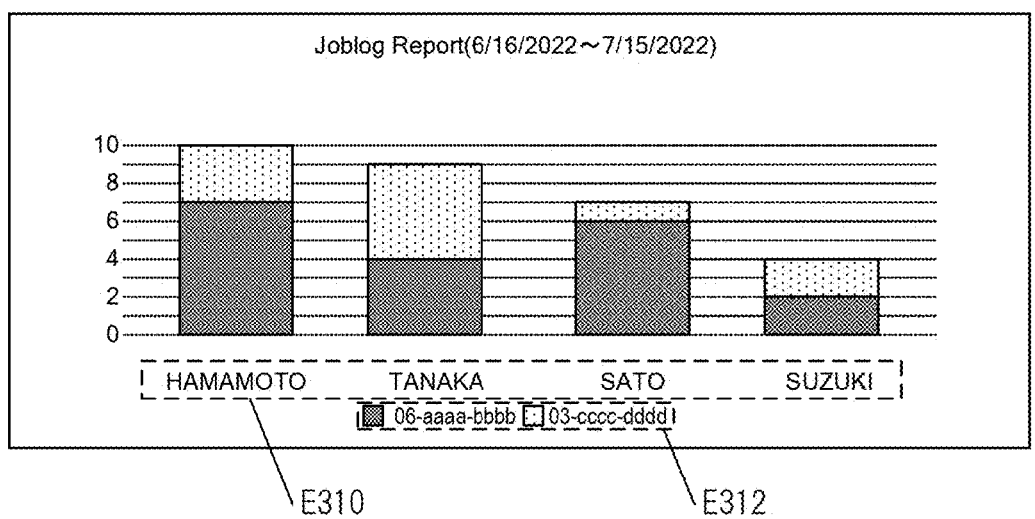

FIGS. 29A and 29B are diagrams illustrating examples of a report including confidential information. The reports illustrated in FIG. 29A and FIG. 29B are examples of reports output when requested by users having different authorities. FIG. 29A is a diagram illustrating an example of a report that includes name information but does not include facsimile number information. FIG. 29B is a diagram illustrating an example of a report including name information and facsimile number information.

As indicated by reference sign E300 in FIG. 29A and reference sign E310 in FIG. 29B, both the report illustrated in FIG. 29A and the report illustrated in FIG. 29B include name information. On the other hand, as indicated by reference sign E302 in FIG. 29A, the facsimile number information is concealed in the report illustrated in FIG. 29A, whereas as indicated by reference sign E312 in FIG. 29B, the facsimile number information is not concealed in the report illustrated in FIG. 29B. As described above, the confidential information included in the report varies depending on the user who requests the report.

As described above, the system according to the present embodiment can change the confidential information to be included in the report according to the authority of the user who is using the management service.

4. Modifications

The disclosure is not limited to the above-described embodiments, and various modifications may be made. That is, implementations obtained by combining techniques appropriately changed without departing from the gist of the disclosure are also included in the technical scope of the disclosure.

Although some parts of the above-described embodiments are described separately for convenience of the description, it is obvious that the embodiments may be combined to be executed within a technically possible range. For example, the second embodiment and the third embodiment may be combined. In this case, even when the image forming device does not have a function of transmitting the job management notification, the system can output a report to the terminal device and can change the confidential information to be included in the report according to the authority of the user who is using the management service.

The program that operates in each device in the embodiments is a program that controls a CPU or the like (a program that causes a computer to function) so as to provide the functions of the above embodiments. The information handled by the devices is temporarily accumulated in a temporary storage device (for example, a RAM) during processing of the information, is then stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (trademark) disc (BD), or the like), and a magnetic recording medium (for example, a magnetic tape, a flexible disk, or the like). Furthermore, not only are the functions of the embodiments described above implemented by the execution of a loaded program, but the functions of the disclosure may also be implemented by processing executed in cooperation with an operating system, other application programs, etc., on the basis of an instruction for the program.

In the case where the program is distributed to a market, the program can be stored and distributed in a portable recording medium or transferred to a server computer connected via a network such as the Internet. In this case, the storage device of the server computer is obviously included in the disclosure.

Each functional block or various features of the devices used in the above-described embodiments may be implemented or executed by an electric circuit, for example, an integrated circuit or multiple integrated circuits. An electrical circuit designed to perform the functions described herein may include a general purpose processor, a digital signal processor (DSP), an application specific integrated circuit (ASIC), a field programmable gate array (FPGA) or other programmable logic device, discrete gate or transistor logic, discrete hardware components; or any combination thereof. A general-purpose processor may be a microprocessor, or alternatively may be any conventional processor, controller, microcontroller, or state machine. The above-described electric circuit may be composed of by a digital circuit or an analog circuit. In the case where an integrated circuit technology that replaces the current integrated circuit appears due to the progress of the semiconductor technology, one or more aspects of the disclosure can use a new integrated circuit according to the technology. For example, in the case of the controller 100 according to the disclosure, some or all of the processing units included in the controller 100 may be composed of electric circuits. Similarly, some or all of the processing units included in the controller 200, the controller 300, and the controller 400 may be composed of electric circuits.

What is claimed is:

1. A method of managing a device, the method comprising: by a first processing device:
    acquiring job information about the device, the device being different from the first processing device, the device being connected to a network and designated as a management target;
    storing association information including confidential information type and information indicating whether to include a type of confidential information depending on an authority level of a specific user;
    generating concealed job information by replacing confidential information with identification information, the confidential information associated with a specific item included in the acquired job information and designated as a confidentiality target;
    receiving, from a user of a second processing device, a request for a report;
    determining an authority level of the user;

based on the association information, determining whether the user is permitted to access the confidential information and the confidential information type associated with the authority level of the user;

in response to determining that the authority level of the user does not permit the user to access to the confidential information, transmitting the generated concealed job information to the second processing device; and in response to determining that the authority level of the user permits the user to access particular confidential information based on the associated confidential information type, transmitting different job information, including the particular confidential information, to the second processing device; and by the second processing device:

receiving the concealed job information or the different job information transmitted from the first processing device;

generating a first report including the concealed job information in response to receiving the concealed job information, or generating a second report including the different job information in response to receiving the different job information; and displaying the first report or the second report to the user.

2. The method of managing the device according to claim 1, wherein the confidential information of the specific item comprises a user name of a user who has executed a job in the device being the management target.

3. The method of managing the device according to claim 1, wherein:

an input is received for designating a user; and the confidential information included in the second report differs depending on user authority included in the input.

4. The method of managing the device according to claim 1, wherein the first processing device is connected to a first network and the second processing device is connected to a second network different from the first network.

5. The method of managing the device according to claim 1, wherein:

the second processing device transmits the first report to the first processing device; and a second report is generated based on the first report, by decrypting the identification information included in the first report into the confidential information corresponding to the identification information, in order to output the second report.

6. The method of managing the device according to claim 5, wherein a screen is displayed for selecting one of the first report and the second report to be output.

7. The method of managing the device according to claim 5, wherein:

the first processing device transmits, to the second processing device, information, for acquiring the second report, generated by the first processing device; and the second processing device outputs the second report.

8. The method of managing the device according to claim 6, wherein:

the first processing device transmits, to the second processing device, information, for acquiring the second report, generated by the first processing device; and the second processing device outputs the second report.

9. The method of managing the device according to claim 7, wherein:

the information for acquiring the second report is a URL (Uniform Resource Locator) indicating a location within the first processing device; and the second report is acquired by accessing the URL.

10. The method of managing the device according to claim 8, wherein:

the information for acquiring the second report is a URL (Uniform Resource Locator) indicating a location within the first processing device; and the second report is acquired by accessing the URL.

11. A computer-readable non-transitory recording medium on which one or more computer-executable instructions are stored and to which a computer is coupled, the computer communicating with devices in a same network and a processing device in the same or another network, the one or more computer-executable instructions, when executed by the computer, cause the computer to:

acquire job information from a device, among the devices, the device being different from the computer-readable non-transitory recording medium, the device being connected to the same network and designated as a management target;

store association information including confidential information type and information indicating whether to include a type of confidential information depending on an authority level of a specific user;

generate concealed job information by replacing confidential information with identification information, the confidential information associated with a specific item included in the acquired job information and designated as a confidentiality target;

receive, from a user of the processing device, a request for a report;

determine an authority level of the user;

based on the association information, determine whether the user is permitted to access the confidential information and the confidential information type associated with the authority level of the user;

in response to determining that the authority level of the user does not permit the user to access to the confidential information, transmit the generated concealed job information to the processing device; and in response to determining that the authority level of the user permits the user to access particular confidential information based on the associated confidential information type, transmit different job information, including the particular confidential information, to the processing device, wherein the processing device;

receives the concealed job information or the different job information transmitted from the computer-readable non-transitory recording medium;

generates a first report including the concealed job information in response to receiving the concealed job information, or generating a second report including the different job information in response to receiving the different job information; and displays the first report or the second report to the user.

12. A system comprising:

a first processing device; and a second processing device, the first processing device comprising:

a first processor; and a first memory in which one or more computer-executable instructions are stored and to which the first processor is coupled, wherein when the one or more computer-executable instructions are executed by the first processor, the first processor is caused to:
- acquire job information about a device, the device being different from the first processing device, the device being connected to a network and designated as a management target;
- store association information including confidential information type and information indicating whether to include a type of confidential information depending on an authority level of a specific user;
- generate concealed job information by replacing confidential information with identification information, the confidential information associated with a specific item included in the acquired job information and designated as a confidentiality target;
- receive, from a user of the second processing device, a request for a report;
- determine an authority level of the user;
- based on the association information, determine whether the user is permitted to access the confidential information and the confidential information type associated with the authority level of the user;
- in response to determining that the authority level of the user does not permit the user to access to the confidential information, transmit the generated concealed job information to the second processing device; and
- in response to determining that the authority level of the user permits the user to access particular confidential information based on the associated confidential information type, transmit different job information, including the particular confidential information, to the second processing device, and the second processing device comprising:
- a second processor; and
- a second memory in which one or more computer-executable instructions are stored and to which the second processor is coupled,
- wherein when the one or more computer-executable instructions of the second memory are executed by the second processor, the second processor is caused to:
  - receive the concealed job information or the different job information transmitted from the first processing device;
  - generate a first report including the concealed job information in response to receiving the concealed job information, or generating a second report including the different job information in response to receiving the different job information; and
  - display the first report or the second report to the user.

* * * * *